(12) United States Patent
Ogura

(10) Patent No.: US 6,314,198 B1
(45) Date of Patent: Nov. 6, 2001

(54) RADIOGRAPHIC, DIGITAL IMAGE PROCESSING SYSTEM

(75) Inventor: Takashi Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/223,598

(22) Filed: Dec. 30, 1998

(30) Foreign Application Priority Data

Sep. 25, 1996 (JP) .................................................. 10-271576
Jan. 8, 1998 (JP) .................................................. 10-002272
Mar. 25, 1998 (JP) .................................................. 10-077348
Oct. 30, 1998 (JP) .................................................. 10-311330
Dec. 16, 1998 (JP) .................................................. 10-357628

(51) Int. Cl.$^7$ ...................................................... G06K 9/00
(52) U.S. Cl. ............................................................ 382/132
(58) Field of Search ................................... 382/128, 131, 382/132, 168, 170, 171, 172, 173, 174, 190, 192, 194, 274, 275, 276, 282, 291, 305, 307, 309, 312, 316, 318; 250/580, 581, 582, 584, 200, 559.01, 559.02, 559.04, 1.05, 1.07, 1.08, 1.19, 1.29, 206, 206.1, 206.2, 472.1, 473.1, 475.2, 492.1, 493.1, 494.1, 505.1; 378/4, 9, 11, 12, 16, 19, 20, 21, 22, 54, 58, 62, 63, 162, 165

(56) References Cited

U.S. PATENT DOCUMENTS 5,084,911   1/1992   Sezan et al. ............................ 378/96
5,319,693 * 6/1994   Eberhard et al. ....................... 378/19
5,483,604 * 1/1996   Salisbury .............................. 382/152
5,526,442 * 6/1996   Baba et al. ............................ 382/132
5,668,845 * 9/1997   Migita .................................... 378/4
5,740,267 * 4/1998   Echerer et al. ....................... 382/132
5,883,985 * 3/1999   Pourjavid ............................. 382/274

FOREIGN PATENT DOCUMENTS 0 857 983 A2   8/1998   (EP) ................................ G01T/1/29

* cited by examiner

Primary Examiner—Andrew W. Johns
Assistant Examiner—Shervin Nakhjavan
(74) Attorney, Agent, or Firm—Morgan & Finnegan, LLP

(57) ABSTRACT

A radiographic, digital image processing system is adapted to process a radiographic, digital image, the radiographic, digital image processing system including a photosensor area defining device for defining an image area corresponding to a location of a photosensor for detecting intensity during radiography on a radiographic, digital image obtained by the radiography, and a characteristic amount generating device for generating a characteristic amount in the image area corresponding to the location of the photosensor on the radiographic, digital image defined by the photosensor area defining device, whereby the characteristic amount corresponding to the location of the photosensor on the radiographic, digital image can be generated without troubling an operator.

142 Claims, 17 Drawing Sheets

FIG. 16

| | | | | | | | | |
|---|---|---|---|---|---|---|---|---|
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |
| 1 | 2 | 3 | 4 | 5 | 4 | 3 | 2 | 1 |

FIG. 17

| | | | | | | | | |
|---|---|---|---|---|---|---|---|---|
| 1 | 1 | 1 | 1 | 1 | 1 | 1 | 1 | 1 |
| 1 | 2 | 2 | 2 | 2 | 2 | 2 | 2 | 1 |
| 1 | 2 | 3 | 3 | 3 | 3 | 3 | 2 | 1 |
| 1 | 2 | 3 | 4 | 4 | 4 | 3 | 2 | 1 |
| 1 | 2 | 3 | 4 | 5 | 4 | 3 | 2 | 1 |
| 1 | 2 | 3 | 4 | 4 | 4 | 3 | 2 | 1 |
| 1 | 2 | 3 | 3 | 3 | 3 | 3 | 2 | 1 |
| 1 | 2 | 2 | 2 | 2 | 2 | 2 | 2 | 1 |
| 1 | 1 | 1 | 1 | 1 | 1 | 1 | 1 | 1 |

RADIOGRAPHIC, DIGITAL IMAGE PROCESSING SYSTEM

BACKGROUND OF THE INVENTION

1. Field of the Invention

The present invention relates a radiographic, digital image processing system for processing a radiographic, digital image.

2. Related Background Art

In recent years, development has been made in radiographic image taking systems arranged in such structure that radiations such as X-rays are radiated onto a subject, a radiographic image as a transmitted image of the subject is picked up directly by a solid state image sensing device, and an image signal corresponding to the radiographic image thus picked up is displayed as a visible image on a CRT (Cathode Ray Tube) display device or the like; or, the image signal corresponding to the radiographic image thus picked up is digitized, image processing is carried out in the digital data state, and it is printed out.

In the radiographic image taking systems described above, photographing portions differ depending upon their photographic purposes, and in the image processing step for visualizing the radiographic image the optimum density and gradation vary every image of processed portion. Therefore, it is necessary to carry out different image processing operations among images of the respective portions.

Meanwhile, computer networks are also spreading recently in medical treatment facilities. Under such circumstances, in addition to the radiographic image taking systems described above, there are also cases where a single image processing device is used to process pieces of radiographic image information taken by different radiographic image taking devices such as a radiographic image taking device using a photo-stimulable phosphor sheet (CR) and a radiographic image taking device using an image intensifier (DR) or the like and the radiographic image information thus processed is outputted to either one of different output devices such as the CRT display device, a film imager device, and a dry printer device.

In the above-stated cases, the operator himself manipulating the image processing device had to carry out a setting operation including a plurality of procedures in order to match the image processing carried out in the image processing device with each taking device or with each output device. This operation was very troublesome to the operator.

When the chest part is photographed, an area of interest varies depending upon circumstances; for example, the area of interest is the pulmonary field in some cases or is a bone part in other cases. Depending upon whether the actual area of interest is the pulmonary field or the bone part, the operator himself had to manipulate an input device such as a mouse or a touch panel so as to carry out the image processing operation in the density and gradation, different between the areas, and to set the image processing device so as to carry out the image processing operation adapted for the area of interest in the radiographic image. These operations also took some time of the operator.

When the subject was a patient provided with a radiation-absorbing auxiliary device such as a pacemaker or a fitting for fixing a bone or the like in the body, the signal level of the part including the auxiliary device or the fitting became lower than that of the part around it. It was, therefore, difficult in some cases to properly carry out the above-stated image processing such as gradation processing.

For example, a radiographic chest image as a photograph of the chest was composed of image areas the pulmonary field readily transmitting radiations and showing high density values and image areas of mediastinal parts hardly transmitting radiations and showing low density values, so that the dynamic range was very wide of the density values of pixels constituting the radiographic image. It was thus considered to be difficult to obtain an image allowing both the pulmonary field and the mediastinal parts to be observed simultaneously in good order on the same radiographic chest image.

A conventional method for solving the above problem was a process for compensating the radiographic image by use of a filter called "self-compensating digital filter" (Mitsuhiro Anan et al., JAPANESE JOURNAL OF RADIOLOGICAL TECHNOLOGY, Vol 45, No. 8 (Aug 1989), p1030) so as to improve the image area desired to be observed by a doctor (the area of interest).

The self-compensating digital filter described itu above is a filter defined by Eq. (1) and Eq. (2) below:

$$S_D = S_{org} + f(S_{US}) \tag{1}$$

$$S_{US} = \sum (S_{org}/M^2) \tag{2}$$

where $S_D$ is a pixel value after the compensation (after the processing), $S_{org}$ is an original (input) image value, $S_{US}$ is an average pixel value obtained in such a way that a mask having the size of M pixels×M pixels is moved on an original image (input image) and an average of pixel values existing in the mask is calculated at each moving portion, and f(x) is a function to represent the function curve as illustrated in FIG. 1.

Described below are characteristics of the function $f(S_{US})$ as illustrated in FIG. 1. Let "BASE" in the figure be a density reference value and "SLOPE" be a compression factor. First, the function $f(S_{US})$ is "0" in the density region of pixel values of "$S_{US}$>BASE", and the function $f(S_{US})$ monotonically decreases at the rate of the compression factor "SLOPE" down to the end point of the density reference value "BASE" in the density region of pixel values of "$0 \leq S_{US} \leq BASE$". The following effect is thus achieved by processing the pixel values $S_{org}$ of the original image by the "self-compensating digital filter" shown in Eq. (1) above; "in an area with a low average density value (average pixel value $S_{US}$) of image, the density values are increased to compress the dynamic range of the low density area but the contrast of fine structure is maintained in each area, so that the low density area is converted as a whole to a higher-density image with the contrast of the fine structure thereof being maintained".

In the method for compensating the radiographic image using the "self-compensating digital filter" as described above, however, predetermined values that were empirically obtained have been used as the density reference value "BASE" and the compression factor "SLOPE"; therefore, the effect of compression of the dynamic range varied, depending upon the difference in a photographing portion, the physical constitution of the patient being the subject, or a radiation dose of radiations. It was thus very difficult and troublesome to effect the optimum dynamic range compression for every photographing part, for every physical constitution of a patient being the subject, or for every radiation dose of radiations.

SUMMARY OF THE INVENTION

An object of the present invention is to provide a radiographic, digital image processing system that can solve the above problems.

Another object of the present invention is to provide a radiographic, digital image processing system that can generate a characteristic amount corresponding to a location of a photosensor on a radiographic, digital image without troubling the operator.

In order to accomplish the above object, an embodiment of the present invention is a radiographic, digital image processing system for processing a radiographic, digital image, comprising: photosensor area defining means for defining an image area corresponding to a location of a photosensor for detecting intensity during radiography on a radiographic, digital image obtained by the radiography; and characteristic amount generating means for generating a characteristic amount in the image area corresponding to the location of the photosensor on the radiographic, digital image defined by said photosensor area defining means.

Another object of the present invention is to provide a radiographic, digital image processing system that can automatically effect the optimum image processing on a radiographic, digital image without troubling the operator.

In order to accomplish the above object, an embodiment of the present invention is a radiographic, digital image processing system for processing a radiographic, digital image, comprising: input means for inputting radiographic, digital image data digitized from an image obtained by radiography; setting means for setting a type of a generating source of the radiographic, digital image data inputted by said input means; photosensor area defining means for defining an image area corresponding to a location of a photosensor for detecting intensity of radiations during the radiography on a radiographic, digital image indicated by the radiographic, digital image data inputted by said input means, according to information concerning the type of the generating source set by said setting means; characteristic amount calculating means for calculating a characteristic amount in the image area corresponding to the location of the photosensor on the radiographic, digital image, defined by said photosensor area defining means; discriminating means for discriminating a photographing portion of the radiographic, digital image indicated by the radiographic, digital image data inputted by said input means; output device selecting means for selecting a type of an output device of the radiographic, digital image; image processing means for effecting density and/or gradation conversion processing according to the information concerning the type of the generating source set by said setting means, information concerning the type of the output device of the radiographic, digital image selected by said output device selecting means, information concerning the photographing portion discriminated by said discriminating means, and information concerning the characteristic amount calculated by said characteristic amount calculating means; and image output means for outputting a visualized, radiographic, digital image corresponding to radiographic, digital image data resulting from the image processing in said image processing means.

Another object of the present invention is to provide a radiographic, digital image processing system that can effect the optimum image processing on a radiographic, digital image without troubling the operator and without causing a malfunction.

In order to accomplish the above object, an embodiment of the present invention is a radiographic, digital image processing system for processing a radiographic, digital image, comprising: input means for inputting radiographic, digital image data digitized from an image obtained by radiography; setting means for setting a type of a generating source of the radiographic, digital image data inputted by said input means; photosensor area defining means for defining an image area corresponding to a location of a photosensor for detecting intensity of radiations during the radiography on a radiographic, digital image indicated by the radiographic, digital image data inputted by said input means, according to information concerning the type of the generating source set by said setting means; subject area extracting means for extracting an image area of a subject on the radiographic, digital image indicated by the radiographic, digital image data inputted by said input means and outputting information concerning the image area of the subject; photosensor area correcting means for correcting the image area corresponding to the location of the photosensor on the radiographic, digital image defined by said photosensor area defining means, according to the information concerning the image area of the subject outputted from said subject area extracting means; characteristic amount calculating means for calculating a characteristic amount in the image area corrected by said photosensor area correcting means; discriminating means for discriminating a photographing portion of the radiographic, digital image indicated by the radiographic, digital image data inputted by said input means; output device selecting means for selecting a type of an output device of the radiographic, digital image; image processing means for effecting density and/or gradation conversion processing according to the information concerning the type of the generating source set by said setting means, information concerning the type of the output device of the radiographic, digital image selected by said output device selecting means, information concerning the photographing portion discriminated by said discriminating means, and information concerning the characteristic amount calculated by said characteristic amount calculating means; and image output means for outputting a visualized, radiographic, digital image corresponding to radiographic, digital image data resulting from the image processing in said image processing means.

Another object of the present invention is to provide a radiographic, digital image processing system that can automatically effect the optimum image processing according to a type of a generating source on a radiographic, digital image without troubling the operator.

In order to accomplish the above object, an embodiment of the present invention is a radiographic, digital image processing system for processing a radiographic, digital image, comprising: input means for inputting radiographic, digital image data digitized from an image obtained by radiography; setting means for setting a type of a generating source of the radiographic, digital image data inputted by said input means; photosensor area defining means for defining an image area corresponding to a location of a photosensor for detecting intensity of radiations during the radiography on a radiographic, digital image indicated by the radiographic, digital image data inputted by said input means, according to information concerning the type of the generating source set by said setting means; characteristic amount calculating means for calculating a characteristic amount in the image area corresponding to the location of the photosensor on the radiographic, digital image, according to a histogram of pixel values in the image area corresponding to the location of the photosensor on the radiographic, digital image, defined by said photosensor area defining means; image processing means for effecting density and/or gradation conversion processing according to the information concerning the type of the generating source set by said setting means and information concerning the characteristic amount calculated by said characteristic amount calculating means; and image output means for outputting a visualized, radiographic, digital image corresponding to radiographic, digital image data resulting from the image processing in said image processing means.

Another object of the present invention is to provide a radiographic, digital image processing system that can automatically and optimally effecting density and/or gradation conversion processing on a radiographic, digital image without troubling the operator.

In order to accomplish the above object, an embodiment of the present invention is a radiographic, digital image processing system for processing a radiographic, digital image, comprising: input means for inputting radiographic, digital image data digitized from an image obtained by radiography; photosensor area defining means for defining an image area corresponding to a location of a photosensor for detecting intensity of radiations during the radiography on a radiographic, digital image indicated by the radiographic, digital image data inputted by said input means; characteristic amount calculating means for calculating a characteristic amount in the image area corresponding to the location of the photosensor on the radiographic, digital image, defined by said photosensor area defining means; image processing means for effecting density and/or gradation conversion processing according to information concerning the characteristic amount calculated by said characteristic amount calculating means, on the radiographic, digital image data inputted by said input means; and image output means for outputting a visualized, radiographic, digital image corresponding to radiographic, digital image data resulting from the image processing in said image processing means.

Another object of the present invention is to provide a radiographic, digital image processing system that can automatically effect weighted image processing on a radiographic, digital image without troubling the operator.

In order to accomplish the above object, an embodiment of the present invention is a radiographic, digital image processing system for processing a radiographic, digital image, comprising: detecting means disposed at a predetermined location for detecting intensity of radiations at a subject during radiography; input means for inputting image data obtained by said radiography; area defining means for defining an image area corresponding to the location of said detecting means on an image of the image data inputted by said input means; weighting means for calculating a value of each pixel value in the image area defined by said area defining means, multiplied by a predetermined weighting factor; and image processing means for effecting density and/or gradation conversion processing according to the weighted value by said weighting means, on the image data inputted by said input means.

Still another object of the present invention is to provide a radiographic, digital image processing system that can automatically and optimally control a dynamic range of a radiographic, digital image without troubling the operator.

In order to accomplish the above object, an embodiment of the present invention is a radiographic, digital image processing system for processing a radiographic, digital image, comprising: input means for inputting radiographic, digital image data digitized from an image obtained by radiography; photosensor area defining means for defining an image area corresponding to a location of a photosensor for detecting intensity during the radiography on a radiographic, digital image indicated by the radiographic, digital image data inputted by said input means; characteristic amount generating means for generating a characteristic amount in the image area corresponding to the location of the photosensor on the radiographic, digital image, defined by said photosensor area defining means; image processing means for effecting image processing to control a dynamic range of the radiographic, digital image indicated by the radiographic, digital image data, on the radiographic, digital image data inputted by said input means, according to information concerning the characteristic amount generated by said characteristic amount generating means; and image output means for outputting a visualized, radiographic, digital image corresponding to radiographic, digital image data resulting from the image processing in said image processing means.

The other objects and features of the present invention than those described above will become more apparent by the detailed description of the embodiments of the invention referring to the drawings which follows.

BRIEF DESCRIPTION OF THE DRAWINGS

FIG. 16 is a diagram for explaining an example of weighting factors;

FIG. 17 is a diagram for explaining another example of weighting factors;

DETAILED DESCRIPTION OF THE PREFERRED EMBODIMENTS

First Embodiment

The present invention will be described in detail, based on the radiographic, digital image processing system as a first embodiment of the present invention.

Figure 1:
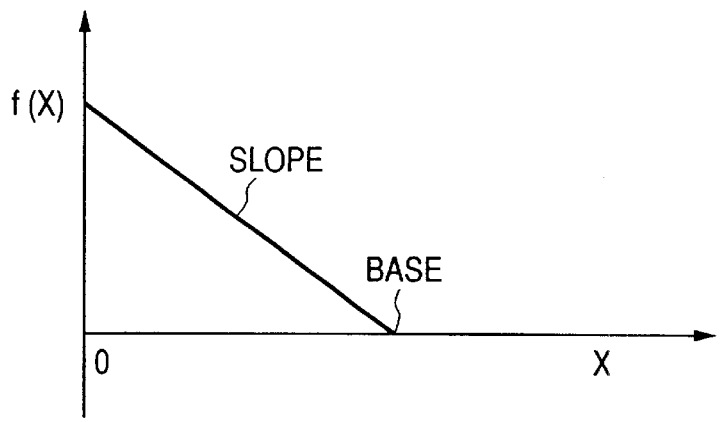
FIG. 1 is a drawing for explaining the conventional, dynamic range compression method.
Figure 2:
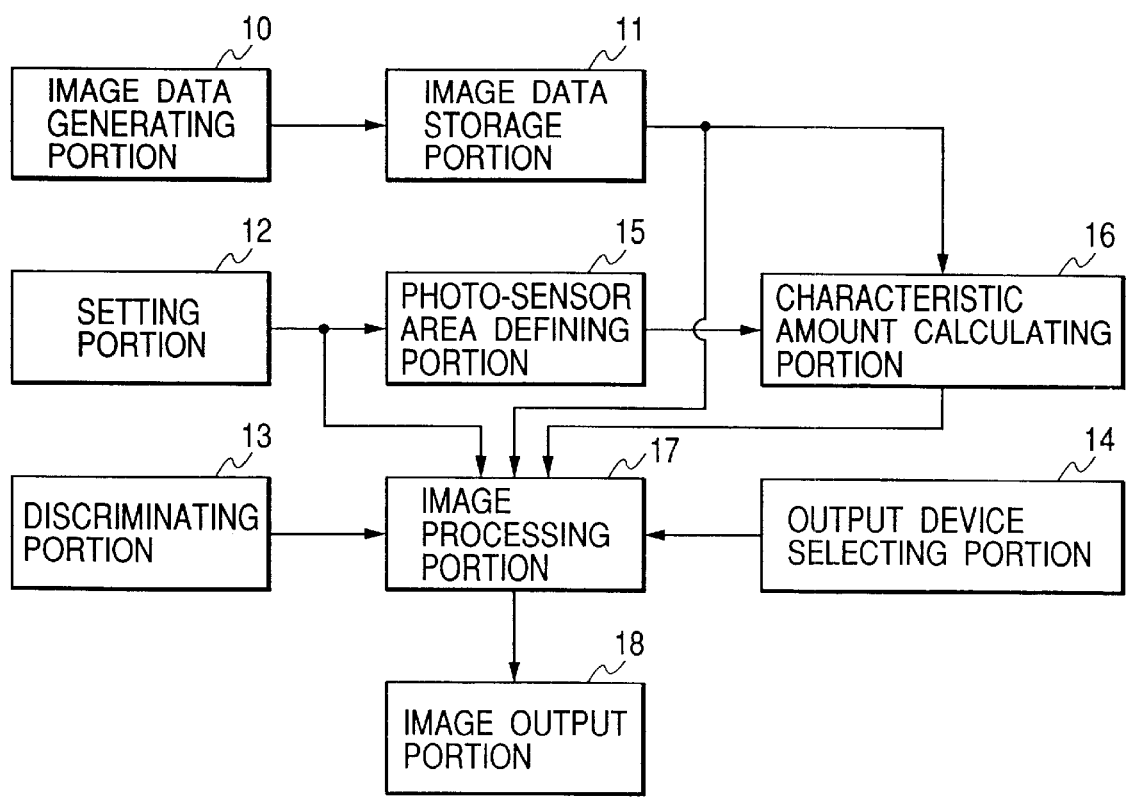
FIG. 2 is a block diagram to show the schematic structure of a radiographic, digital image processing system as a first embodiment of the present invention.

FIG. 2 is a diagram to show the schematic structure of the radiographic, digital image processing system as the first embodiment of the present invention.

In FIG. 2, reference numeral 10 designates an image data generating portion for outputting radiographic, digital image data to a subsequent image storage portion 11, the image data generating portion 10 being, for example, a radiographic image taking apparatus arranged in such structure that radiations such as X-rays are radiated onto the subject, a radiographic image as a transmitted image thereof is picked up directly by a solid state image sensing device, and the apparatus outputs radiographic, digital image data corresponding to the radiographic image thus picked up. In addition to the above radiographic image taking apparatus, the image data generating portion 10 may be either one selected from a radiographic image reading device for reading a radiographic image accumulated and stored in a photo-stimulable phosphor sheet, a radiographic image taking device for radiating radiations to the subject, receiving the radiographic image of the transmitted image thereof on a fluorescent plate, and converting the received image on the fluorescent plate to radiographic, digital image data by the solid state image sensing device, an input interface for capturing the radiographic, digital image data supplied from a radiographic image taking device connected to a computer network, and so on. Namely, the image data generating portion 10 itself does not have to be a radiographic image taking device, but this portion 10 may also be constructed, for example, in such structure that the radiographic image data representing the radiographic image taken by the radiographic image taking device installed at a hospital or the like in a remote place is inputted through the computer network such as Internet into this radiographic, digital image processing system.

Numeral 11 denotes an image data storage portion for storing the radiographic, digital image data supplied from the image data generating portion 10, the image data storage portion 11 being comprised, for example, of a semiconductor memory, a hard-disk drive device, or the like into which data can be written at high speed.

Numeral 12 represents a setting portion for setting a type of a device outputting the radiographic, digital image data in the image data generating portion 10 and for outputting information data indicating the type of the device thus set to a subsequent photosensor area defining portion 15 and to a subsequent image processing portion 17. The setting portion 12 is configured so that the operator himself directly manually sets the type of the device outputting the radiographic, digital image data by manipulating a button or a dial or the like provided in a control panel or by manipulating a keyboard or a mouse or the like as an input device of computer. The radiographic, digital image data is accompanied with information concerning a device generating the radiographic, digital image data, for example, in DICOM, which is the standards of digital picture communication in the medical treatment field. Therefore, in the case where the radiographic, digital image data outputted from the image data generating portion 10 or from the image data storage portion 11 is accompanied with the information concerning the device generating the radiographic, digital image data, the setting portion 12 is configured so as to discriminate the type of the device outputting the radiographic, digital image data according to the accompanying information and automatically set the type of the device.

Numeral 13 denotes a discriminating portion for discriminating a kind of a portion indicated by the radiographic, digital image data outputted from the image data generating portion 10 and for outputting information data indicating the kind of the portion thus discriminated to the subsequent image processing portion 17. The discriminating portion 13 is configured so that the operator himself directly and manually sets the kind of the portion indicated by the radiographic, digital image data by manipulating the button or the dial or the like provided in the control panel or by manipulating the keyboard or the mouse or the like as an input device of computer. The radiographic, digital image data is accompanied with the information concerning the kind of the portion indicated by the radiographic, digital image data, for example, in DICOM, which is the standards of digital picture communication in the medical treatment field. Therefore, in the case where the radiographic, digital image data outputted from the image data generating portion 10 is accompanied with the information concerning the kind of the portion indicated by the radiographic, digital image data, the discriminating portion 13 is configured so as to discriminate the kind of the portion indicated by the radiographic, digital image data according to the accompanying information and automatically set the kind of the portion.

Numeral 14 indicates an output device selecting portion for selecting an output device used for outputting the radiographic, digital image data out of a plurality of output devices such as the CRT display device and the film imager device or the dry printer device and for outputting information indicating a type of an output device selected to the subsequent image processing portion 17. The output device selecting portion 14 is configured so that the operator himself directly and manually selects a device used out of the plurality of output devices by manipulating the button or the dial or the like provided in the control panel or by manipulating the keyboard or the mouse or the like as an input device of computer. For example, where the output device to be used is preset based on the information concerning the type of the device outputting the radiographic, digital image data, set in the setting portion 12, the output device selecting portion 14 is configured so as to automatically select the output device preliminarily set based on the information concerning the type of the device outputting the radiographic, digital image data, without forcing the operator himself to directly manually select the type of the device by manipulating the button, the dial, or the like as described above.

Numeral 15 represents a photosensor area defining portion having a memory table which stores information concerning locations of photosensors of radiographic, digital image taking apparatus corresponding to types of radiographic, digital image taking apparatus set in the setting portion 12, the photosensor area defining portion 15 being arranged to read information concerning an image area corresponding to the position of the photosensor on a radiographic, digital image from the memory table, based on the information concerning the type of the device outputting the radiographic, digital image data, set in the setting portion 12, and to output the read information to a subsequent characteristic amount calculating portion 16.

The photosensor is a sensor for detecting the intensity of radiations radiated during radiography, and the radiographic image taking apparatus is arranged to control the radiant intensity of radiations according to the intensity of radiations detected by the photosensor so that exposure during radiography becomes as desired. For example, where the radiographic image taking apparatus is one for photography of the chest part, the photosensor is located at the position where it touches the chest of the patient being the subject, and the position and shape of the photosensor thus located are visually displayed on a radiation receiving plate in order to allow the operator to guide the patient to a standing position. The operator adjusts the standing position of the patient so that the chest of the patient touches the display. Then the operator photographs the chest of the patient, whereby the radiant intensity of radiations can be controlled so that the exposure during radiography is appropriate in the area around the lung. In this case, the image area corresponding to the position of the photosensor on the radiographic, digital image is coincident with the display.

The information concerning the image area corresponding to the position of the photosensor on the radiographic, digital image, outputted from the photosensor area defining portion 15 to the characteristic amount calculating portion 16, is image data corresponding to the image area directly cut out of the radiographic, digital image or information data indicating coordinates that represent the position of the image area on the radiographic, digital image.

Incidentally, the image area corresponding to the position of the photosensor on the radiographic, digital image does not always have to be changed among the radiographic devices, but a common area may be employed to the radiographic image taking devices. Further, the image area corresponding to the position of the photosensor on the radiographic, digital image does not always have to coincide perfectly with the shape and position of the photosensor actually disposed, but may have some difference from the actual shape and position.

The aforementioned photosensor area defining portion 15 may also be configured so that it is provided with a memory table which stores information concerning locations of photosensors of radiographic, digital image taking apparatus corresponding to kinds of photographing portions discriminated in the discriminating portion 13 and the defining portion 15 is arranged to read the information concerning the image area corresponding to the position of the photosensor on the radiographic, digital image from the memory table, based on the information concerning the kind of the photographing portion discriminated in the discriminating portion 13, and to output the information thus read to the subsequent characteristic amount calculating portion 16.

Numeral 16 designates the characteristic amount calculating portion for calculating information concerning a characteristic amount such as the maximum, the minimum, the average, the median, the mode, and the like of pixel values in the image area, based on the radiographic, digital image data outputted from the image storage portion 11 and the information data concerning the image area corresponding to the position of the photosensor on the radiographic, digital image indicated by the radiographic, digital image data outputted from the image storage portion, which is outputted from the photosensor area defining portion 15, the characteristic amount calculating portion 16 outputting information data concerning the characteristic amount thus calculated to the subsequent image processing portion 17.

Numeral 17 denotes the image processing portion for performing the image processing operation on the radiographic, digital image data stored in the image storage portion 11 so that the image area corresponding to the position of the photosensor has the optimum density and/or gradation, based on the information indicating the type of the radiographic apparatus, outputted from the setting portion 12, the information concerning the photographing portion, outputted from the discriminating portion 13, the information indicating the type of the output device, outputted from the output device selecting portion 14, and the information concerning the characteristic amount of the radiographic, digital data, outputted from the characteristic amount calculating portion 16.

Numeral 18 represents an image output portion, which is the output device such as the CRT display device, the film imager device, or the dry printer device, or the interface or the like for outputting the radiographic, digital image supplied from the image processing portion 17 to the output device connected to the computer network, as described previously. Namely, the image output portion 18 itself does not have to be an output device, but the output portion may be constructed, for example, in such structure that the radiographic image data is supplied via the computer network such as Internet to an output device installed at a remote hospital or the like.

Now, the operation of this radiographic, digital image processing system will be described in detail, using an example in which the chest part of the patient is photographed using the radiographic, digital image taking device having the photosensors at the positions illustrated in FIG. 3 and in which the radiographic, digital image photographed is outputted in a printed form on a film.

Figure 3:
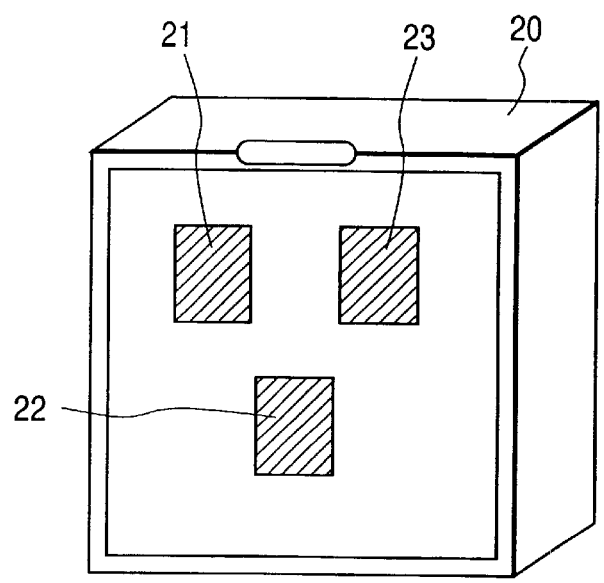
FIG. 3 is a diagram for explaining set positions of photosensors in a radiographic image taking apparatus in the radiographic, digital image processing system illustrated in FIG. 2.

In FIG. 3, numeral 20 denotes a chest contact plate of the radiographic, digital image taking apparatus to be in contact with the chest part of the patient being the subject, and the photosensors for detecting the radiation intensity are located in the illustrated areas 21, 22, 23 on the back surface of the chest contact plate.

First, the radiographic, digital image data corresponding to the radiographic image of the chest part of the patient, outputted from the image data generating portion 10 having the radiographic, digital image taking apparatus with the photosensors located at the positions illustrated in FIG. 3, is sent to the image data storage portion 11 and stored in the semiconductor memory, the hard-disk drive device, or the like.

On the other hand, when the chest part of the patient is photographed by the radiographic, digital image taking apparatus of the above-stated type, the photosensor area defining portion 15 reads the information concerning the image areas corresponding to the positions of the photosensors in the radiographic, digital image taking apparatus used for photography (i.e., the information indicating the image areas 21, 23 in FIG. 3), from the memory table storing the information concerning the locations of the photosensors of radiographic, digital image photographing apparatus, according to the information concerning the type of the device outputting the radiographic, digital image data, set in the setting portion 12.

The characteristic amount calculating portion 16 cuts the image areas corresponding to the positions of the photosensors, out of the radiographic, digital image data supplied from the image data storage portion 11, calculates a full addition value by adding all pixel values in the image areas thus cut out, calculates an average A by dividing the full addition value thus calculated, by the number of pixels in the image areas corresponding to the positions of the photosensors, and outputs the result to the image processing portion 17.

In the case of this operational example, because the system is so arranged that the setting portion 12 sets the type of the radiographic, digital image taking device used for photography, the discriminating portion 13 discriminates the chest part as a photographing portion, and the output device selecting portion 14 selects the film imager device as an output device, the image processing portion 17 performs the density conversion operation based on a density conversion curve having such density conversion characteristics that the average A supplied as the information concerning the characteristic amount from the characteristic amount calculating portion 16 becomes the optimum density value D on the film finally outputted from the film imager device.

Figure 4:
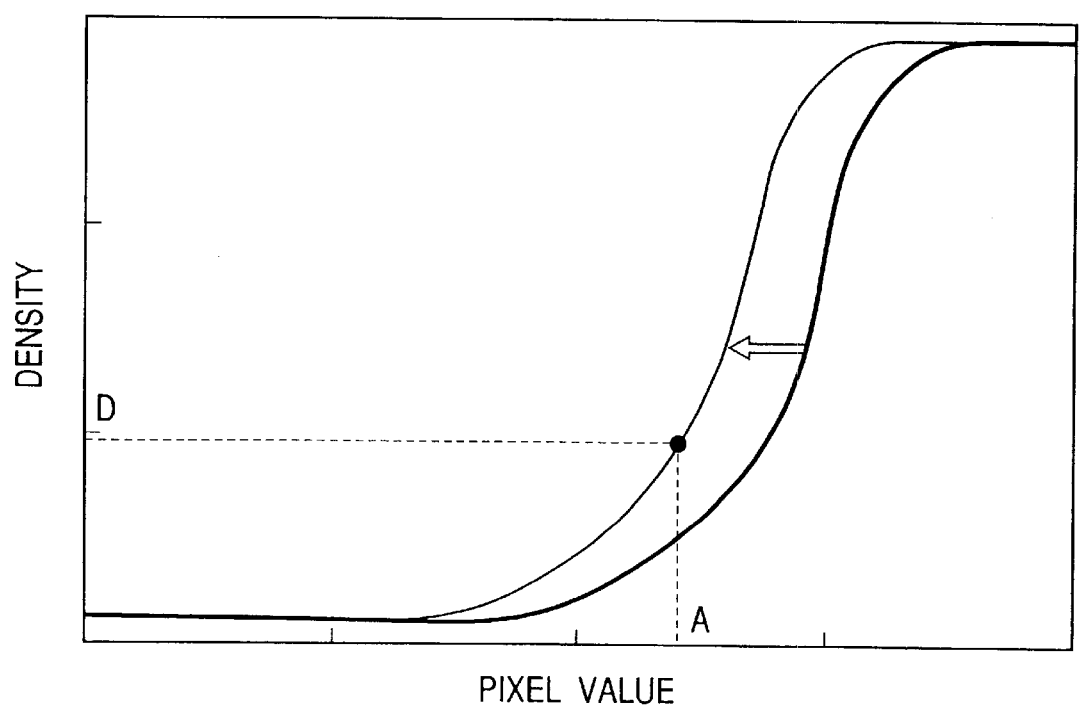
FIG. 4 is a diagram for explaining density conversion characteristics of data stored in a look-up table (LUT) in an image processing portion of the radiographic, digital image processing system Illustrated in FIG. 2.

The image processing portion 17 is equipped with the look-up table (hereinafter abbreviated simply as LUT) storing plural data pieces for respective photographing portions, each data piece indicating a density conversion curve as a reference for the density conversion operation. First, the image processing portion 17 reads from the LUT the data concerning the density conversion curve corresponding to the photographing portion discriminated in the discriminating portion 13. Namely, in the case of this operational example, the data indicating the density conversion curve for the "chest part" having the density conversion characteristics as indicated by the thick solid line in FIG. 4, is automatically read from the LUT.

Then the image processing portion 17 moves the density conversion curve indicated by the data read out of the LUT in parallel so that the average A calculated in the characteristic amount calculating portion 16 becomes the density value D. This compensates the density conversion curve to that actually used in the density conversion operation (i.e., to the density conversion curve having such density conversion characteristics as indicated by the thin solid line in FIG. 4).

Then the image processing portion 17 performs the density conversion operation for the digital, radiographic image indicated by the digital, radiographic image data as a photograph of the chest part of the patient, outputted from the image data storage portion 11, according to the density conversion curve thus corrected, and thereafter supplies the digital, radiographic image data undergoing the density conversion operation, to the image output device 18.

The image output device 18 can thus form a digital, radiographic image in the optimum density on the film by printing the digital, radiographic image on the film with laser intensities corresponding to pixel values indicated by the digital, radiographic image data supplied from the image processing portion 17.

The operational example described above was explained as an example where the photographing portion was the "chest", but, for example in the case where the photographing portion is the "abdominal part", the system may be arranged so that the characteristic amount of image is computed from all the image areas corresponding to the positions of the photosensors indicated by 21, 22, 23 in FIG. 3 and the density conversion operation is carried out based on the characteristic amount thus computed. In another case where the photographing portion is either of the "extremities", the system may be arranged so that the characteristic amount of image is computed from only the image area corresponding to the position of the photosensor indicated by 22 in FIG. 3 and the density conversion operation is carried out based on the characteristic amount thus computed. Further, in this case, the radiographic image taking device having the photosensors located at all the positions indicated by 21, 22, 23 in FIG. 3 does not have to be used, but the digital radiography can also be performed by a radiographic image taking device having the photosensor located only at the position indicated by 22 of FIG. 3.

As described above, the present embodiment can provide the radiographic, digital image processing system capable of automatically performing the optimum image processing operation for the radiographic, digital image without troubling the operator.

Second Embodiment

The present invention will be described in detail, based on the radiographic, digital image processing system as a second embodiment of the present invention.

Figure 5:
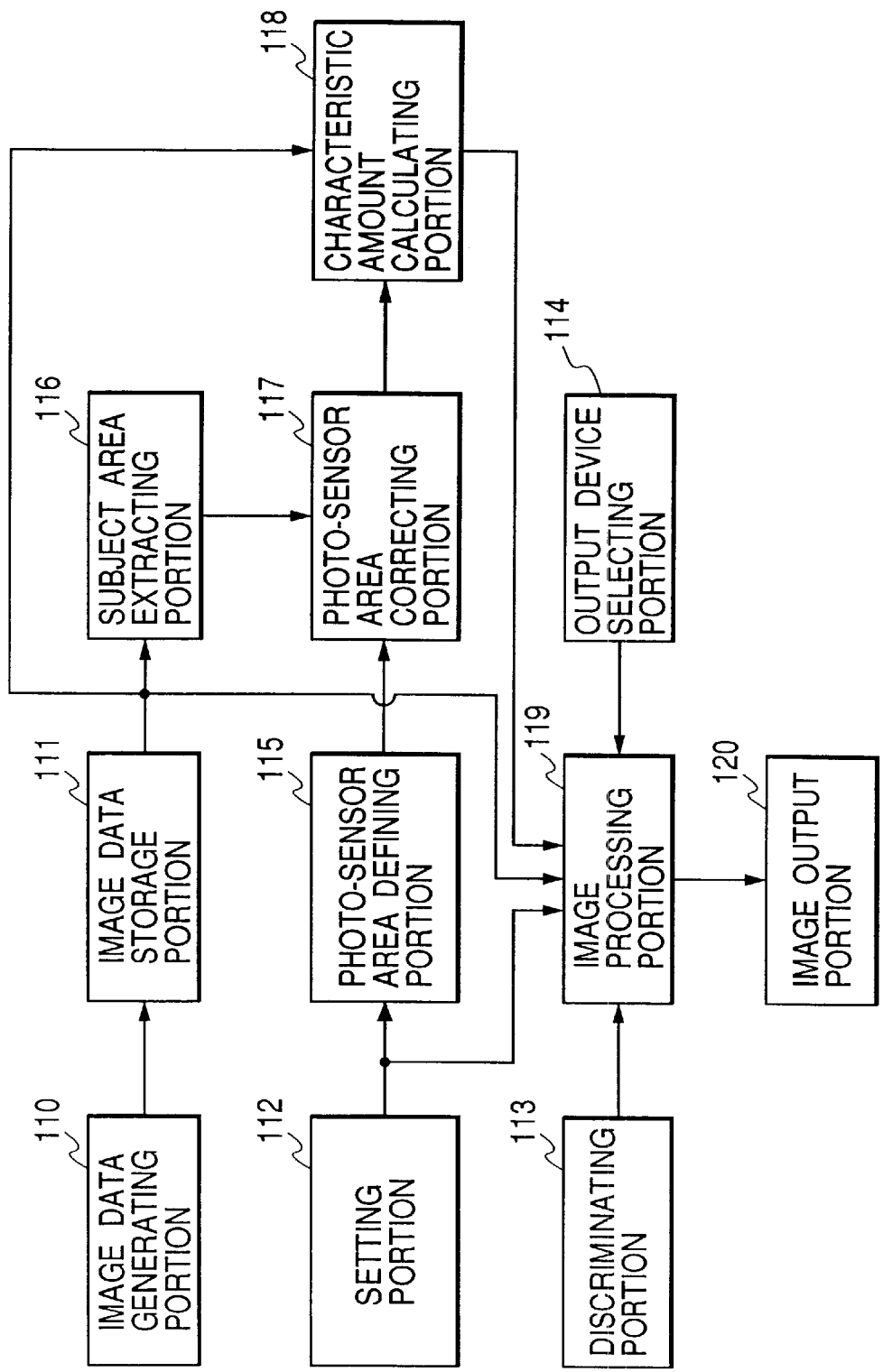
FIG. 5 is a block diagram to show the schematic structure of a radiographic, digital image processing system as a second embodiment of the present invention.

FIG. 5 is a diagram to show the schematic structure of the radiographic, digital image processing system as the second embodiment of the present invention.

In FIG. 5, reference numeral 110 designates an image data generating portion for outputting radiographic, digital image data to a subsequent image storage portion 111, the image data generating portion 110 being, for example, a radiographic image taking apparatus arranged in such structure that radiations such as X-rays are radiated onto the subject, a radiographic image as a transmitted image thereof is picked up directly by a solid state image sensing device, and the apparatus outputs radiographic, digital image data corresponding to the radiographic image thus picked up. In addition to the above radiographic image taking apparatus, the image data generating portion 110 may be either one selected from a radiographic image reading device for reading a radiographic image accumulated and stored in a photo-stimulable phosphor sheet, a radiographic image taking device for radiating radiations to the subject, receiving the radiographic image of the transmitted image thereof on a fluorescent plate, and converting the received image on the fluorescent plate to radiographic, digital image data by the solid state image sensing device, an input interface for capturing the radiographic, digital image data supplied from a radiographic image taking device connected to a computer network, and so on. Namely, the image data generating portion 110 itself does not have to be a radiographic image taking device, but this portion 110 may also be constructed, for example, in such structure that the radiographic image data representing the radiographic image taken by the radiographic image taking device installed at a hospital or the like in a remote place is inputted through the computer network such as Internet into this radiographic, digital image processing system.

Numeral 111 denotes an image data storage portion for storing the radiographic, digital image data supplied from the image data generating portion 110, the image data storage portion 111 being comprised, for example, of a semiconductor memory, a hard-disk drive device, or the like into which data can be written at high speed.

Numeral 112 represents a setting portion for setting a type of a device outputting the radiographic, digital image data in the image data generating portion 110 and for outputting information data indicating the type of the device thus set to a subsequent photosensor area defining portion 115 and to a subsequent image processing portion 119. The setting portion 112 is configured so that the operator himself directly manually sets the type of the device outputting the radiographic, digital image data by manipulating the button or the dial or the like provided in the control panel or by manipulating the keyboard or the mouse or the like as an input device of computer. The radiographic, digital image data is accompanied with information concerning a device generating the radiographic, digital image data, for example, in DICOM, which is the standards of digital picture communication in the medical treatment field. Therefore, in the case where the radiographic, digital image data outputted from the image data generating portion 110 or from the image data storage portion 111 is accompanied with the information concerning the device generating the radiographic, digital image data, the setting portion 112 is configured so as to discriminate the type of the device outputting the radiographic, digital image data according to the accompanying information and automatically set the type of the device.

Numeral 113 denotes a discriminating portion for discriminating a kind of a portion indicated by the radiographic, digital image data outputted from the image data generating portion 110 and for outputting information data indicating the kind of the portion thus discriminated to the subsequent image processing portion 119. The discriminating portion 113 is configured so that the operator himself directly and manually sets the kind of the portion indicated by the radiographic, digital image data by manipulating the button or the dial or the like provided in the control panel or by manipulating the keyboard or the mouse or the like as an input device of computer. The radiographic, digital image data is accompanied with the information concerning the kind of the portion indicated by the radiographic, digital image data, for example, in DICOM, which is the standards of digital picture communication in the medical treatment field. Therefore, in the case where the radiographic, digital image data outputted from the image data generating portion 110 is accompanied with the information concerning the kind of the portion indicated by the radiographic, digital image data, the discriminating portion 113 is configured so as to discriminate the kind of the portion indicated by the radiographic, digital image data according to the accompanying information and automatically set the kind of the portion.

Numeral 114 indicates an output device selecting portion for selecting an output device used for outputting the radiographic, digital image data out of a plurality of output devices such as the CRT display device and the film imager device or the dry printer device and for outputting information indicating a type of an output device selected to the subsequent image processing portion 119. The output device selecting portion 114 is configured so that the operator himself directly and manually selects a device used out of the plurality of output devices by manipulating the button or the dial or the like provided in the control panel or by manipulating the keyboard or the mouse or the like as an input device of computer. For example, where the output device to be used is preset based on the information concerning the type of the device outputting the radiographic, digital image data, set in the setting portion 112, the output device selecting portion 114 is configured so as to automatically select the output device preliminarily set based on the information concerning the type of the device outputting the radiographic, digital image data, without forcing the operator himself to directly manually select the type of the device by manipulating the button, the dial, or the like as described above.

Numeral 115 represents a photosensor area defining portion having a memory table which stores information concerning an image area corresponding to the location, size, shape, etc. of the photosensor of radiographic, digital image taking apparatus corresponding to types of radiographic, digital image taking apparatus set in the setting portion 112, the photosensor area defining portion 115 being arranged to read information concerning an image area corresponding to the location, size, shape, etc. of the photosensor on the radiographic, digital image from the memory table, based on the information concerning the type of the device outputting the radiographic, digital image data, set in the setting portion 112, and to output the read information to a subsequent photosensor area correcting portion 117.

The photosensor is a sensor for detecting the intensity of radiations radiated during radiography, and the radiographic image taking apparatus is arranged to control the radiant intensity and time of radiations according to the intensity of radiations detected by the photosensor so that exposure during radiography becomes as desired.

For example, in the case where the radiographic image taking apparatus is one for photography of the chest part, the photosensor is located at the position where it touches the chest of the patient being the subject, and the position and shape of the photosensor thus located are visually displayed on a radiation receiving plate in order to allow the operator to guide the patient to a standing position. The operator adjusts the standing position of the patient so that the chest of the patient touches the display. Then the operator photographs the chest of the patient, whereby the radiant intensity and time of radiations can be controlled so that the exposure during radiography is appropriate in the area around the lung.

Figure 13:
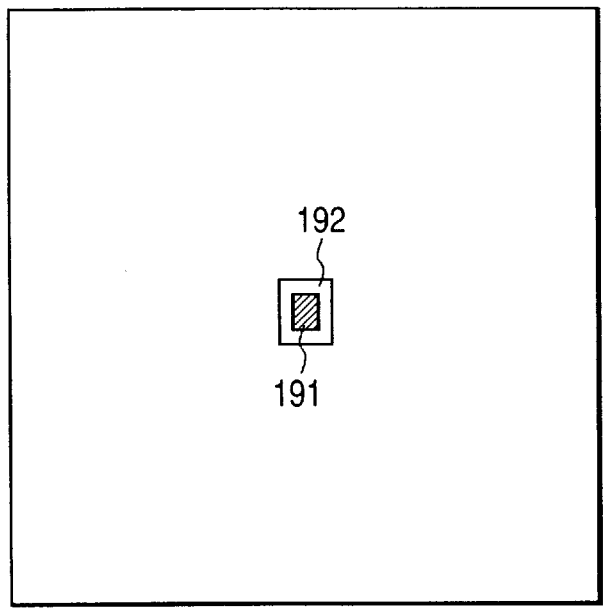
FIG. 13 is a diagram for explaining the set position of the photosensor in the radiographic image taking apparatus for photography of the abdominal part in the radiographic, digital image processing system illustrated in FIG. 5.

When the radiographic image apparatus is one for photography of the abdominal part, as illustrated in FIG. 13, a photosensor is located at a position where it touches the abdomen of the patient being the subject (indicated by 191 in the figure) and a display is given to show an image area (for example, a rectangular area 40 mm wide and 40 mm long indicated by 192 in the figure) to visually indicate the position and shape of the photosensor placed on the radiation receiving plate in order to permit the operator to guide the patient to the standing position. After the operator adjusts the standing position of the patient so that the abdomen of the patient touches the display, the operator carries out photography. Therefore, the radiant intensity and time of radiations can be controlled so that the exposure during radiography becomes appropriate in the area around the abdomen.

Figure 14:
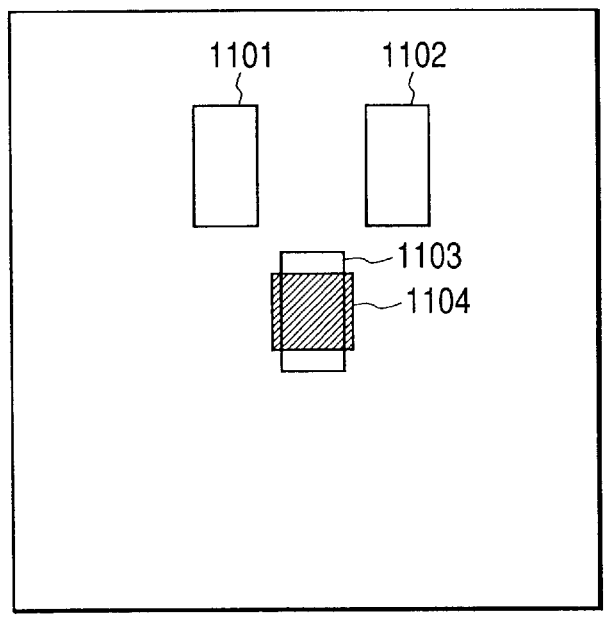
FIG. 14 is a diagram for explaining the set positions of the photosensors in the radiographic image taking apparatus for photography of the chest part in the radiographic, digital image processing system illustrated in FIG. 5.

In the above-stated case, the image area corresponding to the position of the photosensor on the radiographic, digital image is coincident with the display. However, the radiographic image device for photography of the chest part may also be arranged as illustrated in FIG. 14. In the apparatus of FIG. 14, in order to make it easier for the operator to guide the patient to the standing position, on the radiation receiving plate, on which the chest of the patient being the subject is placed, there are displays of image areas to visually indicate positions and shapes of rectangular photosensors 50 mm wide and 90 mm long, one at a position on the center line of the receiving plate (1103 in the figure) and two at positions 20 mm apart each from the center line (1101, 1102 in the figure), and a photosensor located at a position (1104 in the figure) overlapping with the image area 1103 of the photosensor. After the operator adjusts the standing position of the patient so that the abdomen of the patient touches the displays, the operator carries out photography. The radiant intensity and time of radiations are controlled so that the exposure during radiography becomes proper in the area around the abdomen. In this apparatus, all the image areas indicating the positions of photosensors on the radiographic, digital image do not coincide with the image area of the photosensor actually set, and no photosensor is actually set in the image areas of 1101, 1102 in the figure. This apparatus may be used for the photography.

Namely, radiographic technicians, who are operators of the radiographic, digital image processing system, are guided to take a photograph in such a state that the part of the patient to be photographed is placed on the display of location of the photosensor on the occasion of radiography. It is thus normal practice to carry out radiography after leading the patient so that the part of the patient being the subject is coincident with the position where the photosensor is located. In the radiographic, digital image processing system of the embodiment of the present invention, the image processing is carried out so as to optimize the density and/or the gradation in the image area corresponding to the location of the photosensor on the radiographic, digital image by making use of the characteristic amount of the image area corresponding to the location, size, shape, etc. of the photosensor used heretofore in the radiographic apparatus, irrespective of whether photography is carried out using the photosensor, on the occasion of determining the processing conditions in the image processing operation such as the density and/or gradation processing for the radiographic, digital image photographed.

The information concerning the image area corresponding to the position of the photosensor on the radiographic, digital image, outputted from the photosensor area defining portion 115 to the photosensor area correcting portion 117, is image data corresponding to the image area directly cut out of the radiographic, digital image or information data indicating coordinates that represent the position of the image area on the radiographic, digital image.

Incidentally, the image area corresponding to the position of the photosensor on the radiographic, digital image does not always have to be changed among the radiographic devices, but a common area may be employed to the radiographic image taking devices. Further, the image area corresponding to the position of the photosensor on the radiographic, digital image does not always have to coincide perfectly with the shape and position of the photosensor actually disposed, but may have some difference from the actual shape and position.

The aforementioned photosensor area defining portion 115 may also be configured so that it is provided with a memory table which stores information concerning locations of photosensors of radiographic, digital image taking apparatus corresponding to kinds of photographing portions discriminated in the discriminating portion 113 and the defining portion 115 is arranged to read the information concerning the image area corresponding to the position of the photosensor on the radiographic, digital image from the memory table, based on the information concerning the kind of the photographing portion discriminated in the discriminating portion 113, and to output the information thus read to the subsequent photosensor area correcting portion 117.

Figure 6:
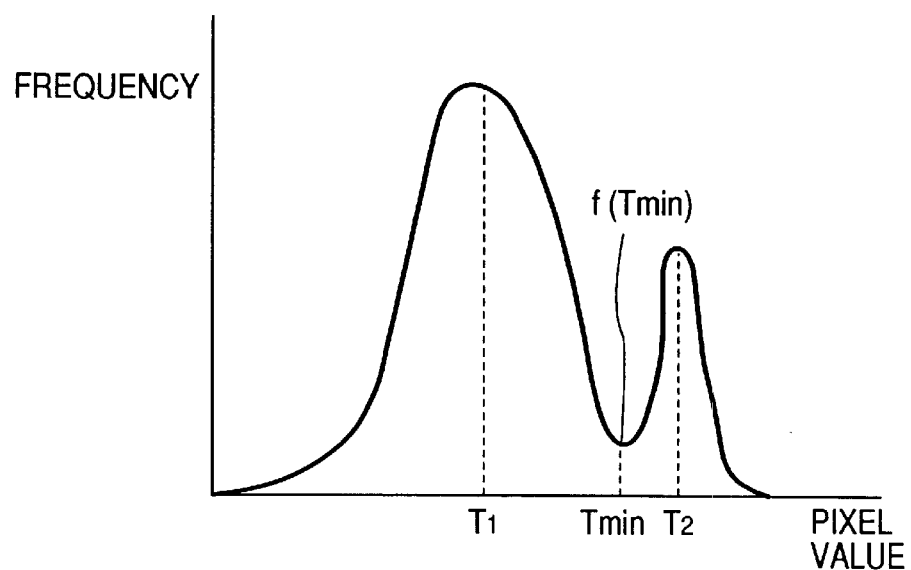
FIG. 6 is a diagram for explaining an extraction processing operation of information data concerning an image area corresponding to a subject area in a subject area extracting portion of the radiographic, digital image processing system illustrated in FIG. 5.

Numeral 116 designates a subject area extracting portion for calculating a histogram of the radiographic, digital image indicated by the radiographic, digital image data outputted from the image storage means 111, determining a subject area and a through area other than the subject area in the radiographic, digital image from the histogram calculated, thereby extracting information data concerning an image area corresponding to the subject area from the radiographic, digital image data, and outputting the information data concerning the image area corresponding to the subject area, thus extracted, to the subsequent photosensor area correcting portion 117. For example, in the histogram of radiographic, digital image as illustrated in FIG. 6, the subject area extracting portion 116 first detects local maximum levels T1, T2 of the histogram and checks whether the positions of the two maximum levels T1, T2 detected are sufficiently apart from each other on the histogram. After confirming it, the subject area extracting portion 116 obtains a level Tmin to indicate a minimum level f(Tmin) of the histogram between these two maximum levels T1, T2. Using the level Tmin obtained as a boundary (threshold), the image area having the maximum at the maximum level T1 to indicate a level below the level Tmin is determined as the subject area in the radiographic, digital image, while the image area having the maximum at the maximum level T2 to indicate a level over the level Tmin as the through area in the radiographic, digital image, whereby the information data concerning the image area corresponding to the subject area can be extracted from the radiographic, digital image data.

Figure 7:
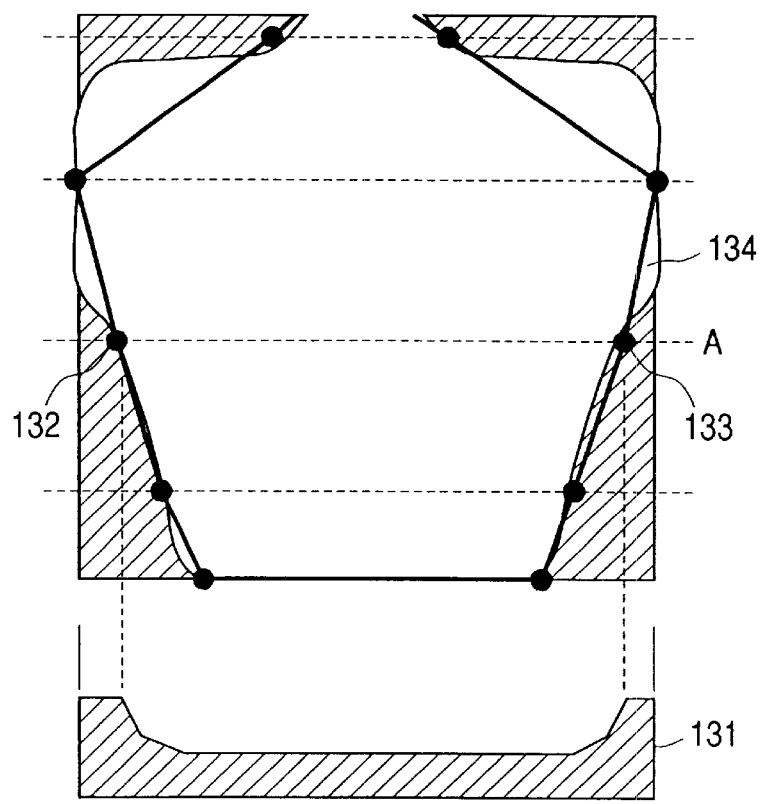
FIG. 7 is a diagram for explaining another method of the extraction processing operation of information data concerning an image area corresponding to a subject area in the subject area extracting portion of the radiographic, digital image processing system illustrated in FIG. 5.

Another extracting method of the information data concerning the image area corresponding to the subject area in the above subject area extracting portion 116 is, for example, a method for, as illustrated in FIG. 7, detecting a lateral profile 131 at an arbitrary position A on the radiographic, digital image, defining positions where the level changes over a certain threshold, as contour points 132, 133 of the subject area, repeating the same operation at predetermined intervals in the vertical direction, and connecting the contour points, thereby extracting the information data concerning the inside of the image area surrounded by straight lines 134, as the information data concerning the image area corresponding to the subject area.

Numeral 117 designates the photosensor area correcting portion for comparing the information data concerning the image area corresponding to the position of the photosensor, outputted from the photosensor area defining portion 115, with the image area corresponding to the subject area, outputted from the subject area extracting portion 116, and for correcting the information data concerning the image area corresponding to the position of the photosensor when there is deviation between the image area corresponding to the position of the photosensor and the image area corresponding to the subject area. For example, when the image area 141 corresponding to the position of the photosensor (the rectangular area within the black frame) does not perfectly overlap with the image area 142 corresponding to the subject area (the blank area) to have small deviation, as illustrated in FIG. 8, the photosensor area correcting portion 117 corrects the information data concerning the image area corresponding to the position of the photosensor to the information data representing the image area of the shape as indicated by the hatched portion 143 of FIG. 8, and then outputs the image data corresponding to the image area of the photosensor, thus corrected, or the information data indicating coordinates of each vertex of the image area to the subsequent characteristic amount calculating portion 118.

Figure 8:
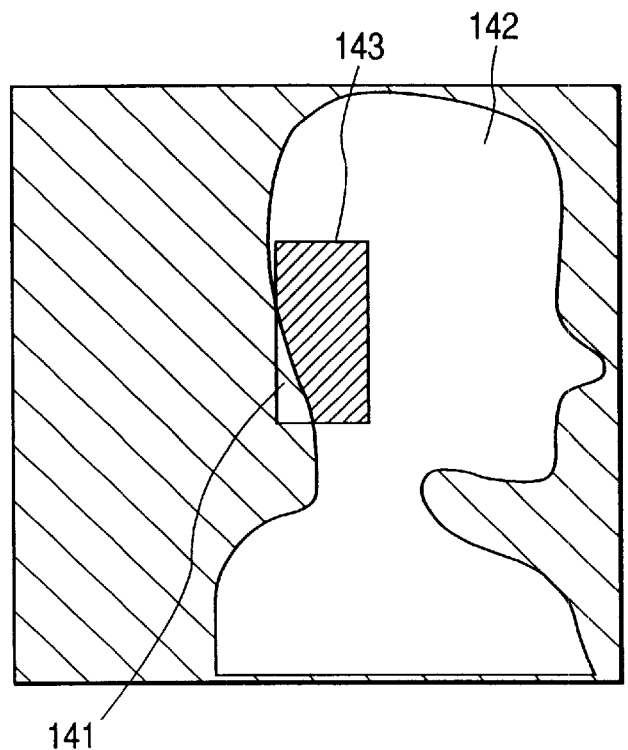
FIG. 8 is a diagram for explaining a correction operation of information data concerning an image area corresponding to a position of a photosensor in a photosensor area correcting portion of the radiographic, digital image processing system illustrated in FIG. 5.

As described above, the as-corrected image area corresponding to the position of the photosensor indicated by the hatched portion 143 of FIG. 8 is polygonal, but it may be corrected to information indicating a rectangular image area inscribed in the polygonal image area in order to facilitate processing in the subsequent characteristic amount calculating portion 118.

Numeral 118 designates the characteristic amount calculating portion for selecting as a characteristic amount at least either one of the maximum, the minimum, the average, the median, the mode, etc. of pixel values in the image area and calculating information concerning the characteristic amount, based on the radiographic, digital image data outputted from the image storage portion 111 and the information data concerning the image area corresponding to the position of the photosensor on the radiographic, digital image indicated by the radiographic, digital image data outputted from the image storage portion 111, outputted from the photosensor area correcting portion 117, the characteristic amount calculating portion 118 outputting the information data concerning the characteristic amount thus calculated to the subsequent image processing portion 119.

When there are plural (three) image areas corresponding to the positions of the photosensors as in the case where the photographing portion is the chest part of the patient, the above characteristic amount calculating portion 118 may also be arranged, for example, to calculate as the information data concerning the characteristic amount the maximum and minimum, or the average of each of the three image areas and output the information data calculated to the subsequent image processing portion 119.

Figure 11:
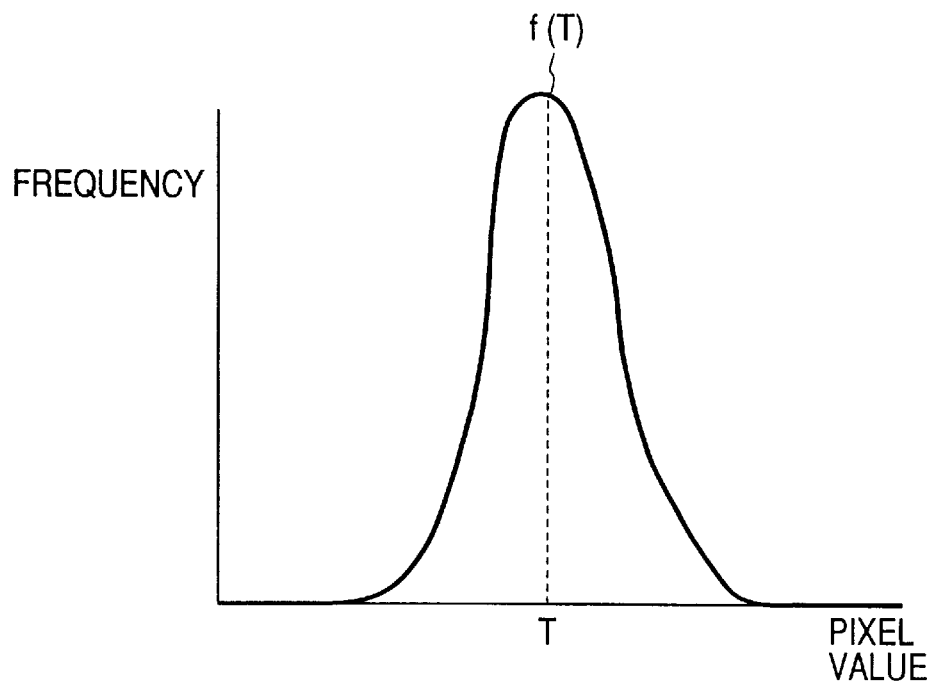
FIG. 11 is a diagram for explaining a characteristic amount calculating operation in a characteristic amount calculating portion where the subject is a normal patient, in the radiographic, digital image processing system illustrated in FIG. 5.

Incidentally, the information concerning the characteristic amount, calculated in the above characteristic amount calculating portion 118, is calculated based on the histogram of pixel values in the image area corresponding to the position of the photosensor on the radiographic, digital image. Namely, the histogram of pixel values in the image area corresponding to the position of the photosensor on the radiographic, digital image becomes one as illustrated in FIG. 11 where the subject is a normal patient. In this case, the pixel level T providing the maximum f(T) of frequency is computed as the information concerning the characteristic amount, for example.

Figure 12:
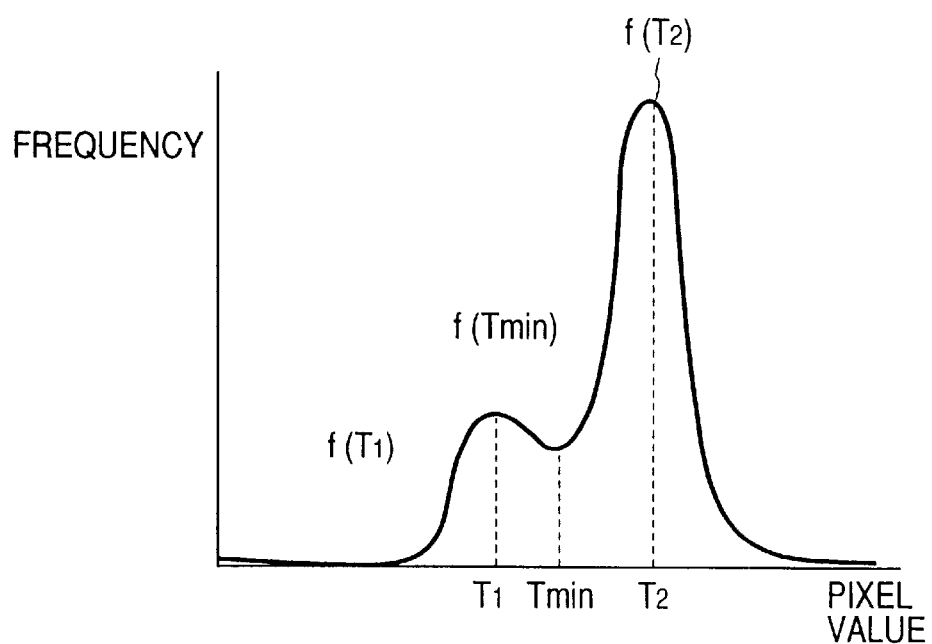
FIG. 12 is a diagram for explaining the characteristic amount calculating operation in the characteristic amount calculating portion where the subject is a patient provided with a radiation-absorbing auxiliary device such as a pacemaker or a fitting for fixing a bone or the like in the body, in the radiographic, digital image processing system illustrated in FIG. 5.

When the subject is a patient provided with the radiation-absorbing auxiliary device such as a pacemaker or a fitting for fixing the bone or the like in the body and when an image area of the auxiliary device such as the pacemaker or the fitting for fixing the bone or the like is present inside or near the image area corresponding to the position of the photosensor, the histogram, however, is a bimodal histogram as illustrated in FIG. 12. Therefore, the characteristic amount calculating portion 118 first detects local maximum levels T1, T2 of the histogram in the bimodal histogram as illustrated in FIG. 12 and checks whether locations of the two maximum levels T1, T2 detected are sufficiently apart from each other on the histogram. After confirming it, the characteristic amount calculating portion 118 obtains the level Tmin to indicate the minimum level f(Tmin) of the histogram between these two maximum levels T1, T2.

Incidentally, the auxiliary device such as the pacemaker or the fitting for fixing the bone or the like generally has low transmittance of radiations (i.e., high absorptance of radiations). Using the level Tmin obtained as described above, as a border (threshold), an image area having the maximum at the maximum level T1 to indicate a level below the level Tmin in the histogram is defined as an area in which the auxiliary device or the fitting exists in the radiographic, digital image, while an image area having the maximum at the maximum level T2 to indicate a level over the level Tmin is defined as an area in which the auxiliary device or the fitting does not exist in the radiographic, digital image, whereby the image area except for the area including the auxiliary device or the fitting can be extracted from the radiographic, digital image data. The information concerning the characteristic amount is calculated based on the histogram of pixel values in the image area thus extracted and the information concerning the characteristic amount calculated is outputted to the subsequent image processing portion 119. This permits the subsequent image processing portion 119 to carry out the appropriate image processing for the radiographic, digital image data stored in the image storage portion 111 so that the image area corresponding to the position of the photosensor has the optimum density and/or gradation without being affected by the auxiliary device such as the pacemaker or the fitting for fixing the bone or the like, in the case where the subject is the patient provided with the radiating-absorbing auxiliary device such as the pacemaker or the fitting for fixing the bone or the like.

Numeral 119 denotes the image processing portion for performing the image processing operation on the radiographic, digital image data stored in the image storage portion 111 so that the image area corresponding to the position of the photosensor has the optimum density and/or gradation, based on the information indicating the type of the radiographic apparatus, outputted from the setting portion 112, the information concerning the photographing portion, outputted from the discriminating portion 113, the information indicating the type of the output device, outputted from the output device selecting portion 114, and the information concerning the characteristic amount of the radiographic, digital data, outputted from the characteristic amount calculating portion 118.

Numeral 120 represents an image output portion, which is the output device such as the CRT display device, the film imager device, or the dry printer device, or the interface or the like for outputting the radiographic, digital image supplied from the image processing portion 119 to the output device connected to the computer network, as described previously. Namely, the image output portion 120 itself does not have to be an output device, but the output portion may be constructed, for example, in such structure that the radiographic image data is supplied from this radiographic, digital image processing system via the computer network such as Internet to an output device installed at a remote hospital or the like.

Now, the operation of this radiographic, digital image processing system will be described in detail, using an example in which the chest part of the patient is photographed using the radiographic, digital image taking device having the photosensors at the positions illustrated in FIG. 9 and in which the radiographic, digital image photographed is outputted in a printed form on a film.

Figure 9:
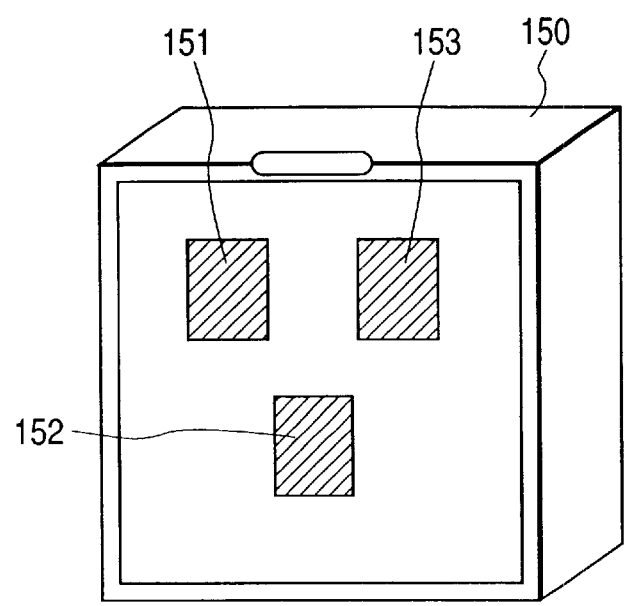
FIG. 9 is a diagram for explaining the set positions of the photosensors in the radiographic image taking apparatus in the radiographic, digital image processing system illustrated in FIG. 5.

In FIG. 9, numeral 150 denotes a chest contact plate of the radiographic, digital image taking apparatus to be in contact with the chest part of the patient being the subject, and the photosensors for detecting the radiation intensity are located in the illustrated areas 151, 152, 153 on the back surface of the chest contact plate.

First, the radiographic, digital image data corresponding to the radiographic image of the chest part of the patient, outputted from the image data generating portion 110 having the radiographic, digital image taking apparatus with the photosensors located at the positions illustrated in FIG. 9, is sent to the image data storage portion 111 and stored in the semiconductor memory, the hard-disk drive device, or the like.

On the other hand, when the chest part of the patient is photographed by the radiographic, digital image taking apparatus of the above-stated type, the photosensor area defining portion 115 reads the information concerning the image areas corresponding to the positions of the photosensors in the radiographic, digital image taking apparatus used for photography (i.e., the information indicating the image areas 151, 153 in FIG. 9), from the memory table storing the information concerning the locations of the photosensors of radiographic, digital image photographing apparatus, according to the information concerning the type of the device outputting the radiographic, digital image data, set in the setting portion 112, and outputs it to the photosensor area correcting portion 117.

The subject area extracting portion 116 calculates the histogram of the radiographic, digital image indicated by the radiographic, digital image data outputted from the image storage means 111, determines the subject area and the through area other than the subject area in the radiographic, digital image from the histogram calculated, thereby extracting the information data concerning the image area corresponding to the subject area from the radiographic, digital image data, and outputs the information data concerning the image area corresponding to the subject area thus extracted to the subsequent photosensor area correcting portion 117.

Then the photosensor area correcting portion 117 compares the information data concerning the image area corresponding to the position of the photosensor, outputted from the photosensor area defining portion 115, with the information data concerning the image area corresponding to the subject area, outputted from the subject area extracting portion 116. When there is deviation between the image area corresponding to the position of the photosensor and the image area corresponding to the subject area, the photosensor area correcting portion 117 corrects the information data concerning the image area corresponding to the position of the photosensor and outputs the corrected information data concerning the image area corresponding to the position of the photosensor to the subsequent characteristic amount calculating portion 118.

The characteristic amount calculating portion 118 cuts the image area corresponding to the position of the photosensor out of the radiographic, digital image data supplied from the image data storage portion 111, according to the information data concerning the image area corresponding to the position of the photosensor, outputted from the photosensor area correcting portion 117, then calculates the full addition value by adding all the pixel values in the image area thus cut out, calculates the average A by dividing the full addition value thus calculated by the number of pixels in the image area corresponding to the position of the photosensor, and outputs the result to the image processing device 119.

In the case of this operational example, because the system is so arranged that the setting portion 112 sets the type of the radiographic, digital image taking device used for photography, the discriminating portion 113 discriminates the "chest part" as a photographing portion, and the output device selecting portion 114 selects the film imager device as an output device, the image processing portion 119 performs the density conversion operation based on a density conversion curve having such density conversion characteristics that the average A supplied as information concerning the characteristic amount from the characteristic amount calculating portion 118 becomes the optimum density value D on the film finally outputted from the film imager device.

Figure 10:
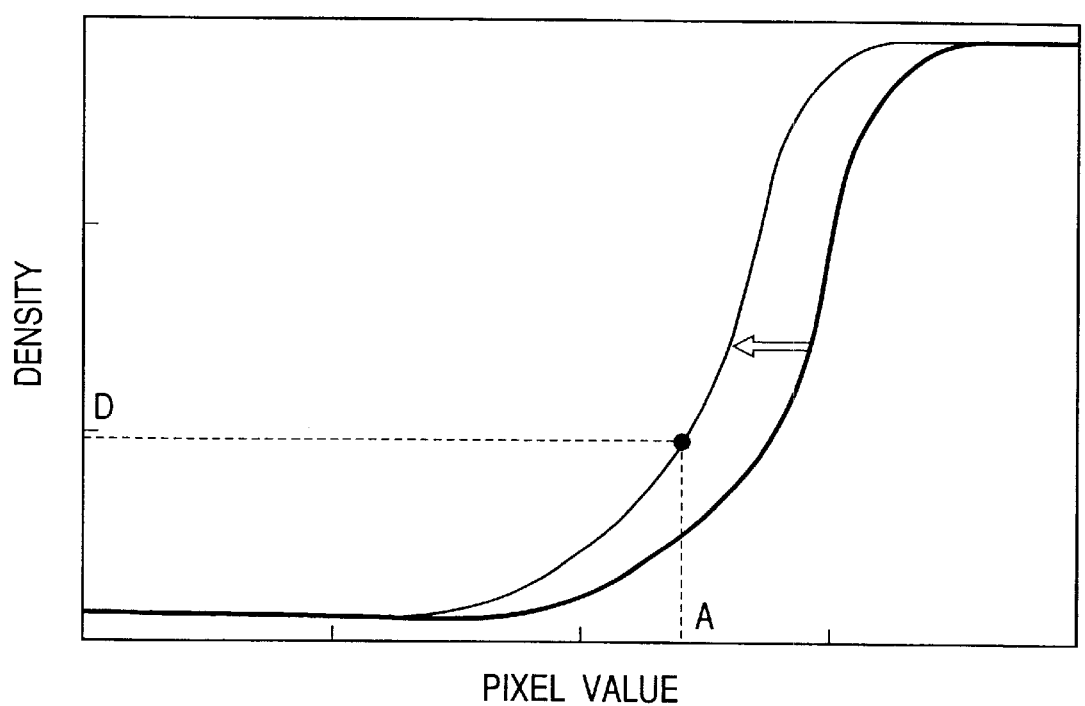
FIG. 10 is a diagram for explaining density conversion characteristics of data stored in the look-up table (LUT) in the image processing portion of the radiographic, digital image processing system illustrated in FIG. 5.

The image processing portion 119 is equipped with the look-up table (hereinafter abbreviated simply as LUT) storing plural data pieces for respective photographing portions, each data piece indicating a density conversion curve as a reference for the density conversion operation. First, the image processing portion 119 reads from the LUT the data concerning the density conversion curve corresponding to the photographing portion discriminated in the discriminating portion 113. Namely, in the case of this operational example, the data indicating the density conversion curve for the "chest part" having the density conversion characteristics as indicated by the thick solid line in FIG. 10, is automatically read from the LUT.

Then the image processing portion 119 moves the density conversion curve indicated by the data read out of the LUT in parallel so that the average A calculated in the characteristic amount calculating portion 118 becomes the density value D. This compensates the density conversion curve to that actually used in the density conversion operation (i.e., to the density conversion curve having such density conversion characteristics as indicated by the thin solid line in FIG. 10).

Then the image processing portion 119 performs the density conversion operation for the digital, radiographic image indicated by the digital, radiographic image data as a photograph of the chest part of the patient, outputted from the image data storage portion 111, according to the density conversion curve thus corrected, and thereafter supplies the digital, radiographic image data undergoing the density conversion operation, to the image output device 120.

The image output device 120 can thus form a digital, radiographic image in the optimum density on the film by printing the digital, radiographic image on the film with laser intensities corresponding to pixel values indicated by the digital, radiographic image data supplied from the image processing portion 119.

The operational example described above was explained as an example where the photographing portion was the "chest", but, for example in the case where the photographing portion is the "abdominal part", the system may be arranged so that the characteristic amount of image is computed from all the image areas corresponding to the positions of the photosensors indicated by 151, 152, 153 in FIG. 9 and the density conversion operation is carried out based on the characteristic amount thus computed. In another case where the photographing portion is either of the "extremitie" and the "cervical vertebrae", the system may be arranged so that the characteristic amount of image is computed from only the image area corresponding to the position of the photosensor indicated by 152 in FIG. 9 and the density conversion operation is carried out based on the characteristic amount thus computed. Further, in this case, the radiographic, digital image taking device having the photosensors located at all the positions indicated by 151, 152, 153 in FIG. 9 does not have to be used, but the digital radiography can also be performed by a radiographic, digital image taking device having the photosensor located only at the position indicated by 152 of FIG. 9.

As described above, the present embodiment can provide the radiographic, digital image processing system capable of automatically performing the optimum image processing operation for the radiographic, digital image without troubling the operator.

Third Embodiment

The third embodiment of the present invention will be described by reference to the drawings.

Figure 15:
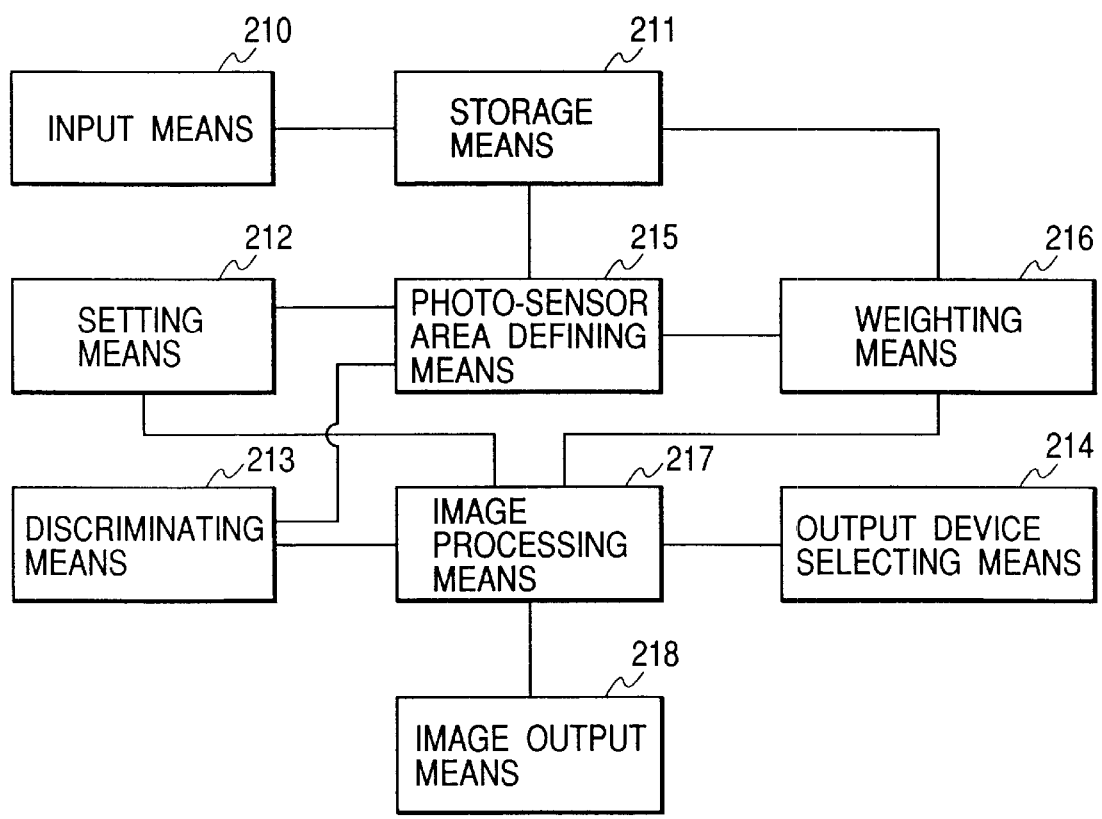
FIG. 15 is a block diagram to show the schematic structure of a radiographic, digital image processing system as a third embodiment of the present invention.

FIG. 15 is a diagram to show the schematic structure of the radiographic, digital image processing system as the third embodiment of the present invention.

In FIG. 15, reference numeral 210 designates an input means for outputting radiographic, digital image data to a subsequent storage means 211, the input means 210 being, for example, a radiographic image taking apparatus arranged in such structure that radiations such as X-rays are radiated onto the subject, a radiographic image as a transmitted image thereof is picked up directly by a solid state image sensing device, and the apparatus outputs radiographic, digital image data corresponding to the radiographic image thus picked up.

In addition to the above radiographic image taking apparatus, this input means 210 may be either one selected from an image reading device for reading an X-ray image accumulated and stored in a photo-stimulable phosphor sheet, a radiographic image taking device for radiating radiations to the subject, receiving the radiographic image of the transmitted image thereof on a fluorescent plate, and converting the received image on the fluorescent plate to radiographic, digital image data by the solid state image sensing device, an input interface for capturing the radiographic, digital image data supplied from a radiographic image taking device connected to a computer network, and so on.

Namely, the input means 210 itself does not have to be a radiographic image taking device, but this input means 210 may also be constructed, for example, in such structure that the radiographic image data representing the radiographic image taken by the radiographic image taking device installed at a hospital or the like in a remote place is inputted through the computer network such as Internet into this radiographic, digital image processing system.

Numeral 211 denotes a storage means 211 for storing the radiographic, digital image data supplied from the input means 210, the storage means 211 being comprised, for example, of a semiconductor memory, a hard-disk drive device, or the like into which data can be written at high speed.

Numeral 212 represents a setting means for setting a type of a device for setting a type of a generating source of the radiographic, digital image data in the above input means 210 and for outputting information indicating the type of the generating source thus set to a subsequent photosensor area defining means 215 and to a subsequent image processing means 217.

The setting means 212 is configured so that the operator himself directly manually sets the type of the generating source of the radiographic, digital image data by manipulating the button or the dial or the like provided in the control panel or by manipulating the keyboard or the mouse or the like as an input device of computer.

The radiographic, digital image data is accompanied with the information concerning the type of the generating source of the radiographic, digital image data, for example, in DICOM, which is the standards of digital picture communication in the medical treatment field. Therefore, in the case where the radiographic, digital image data outputted from the above input means 210 is accompanied with the information concerning the type of the generating source, the setting means 212 may be configured so as to discriminate the type of the generating source according to the accompanying information and automatically set the type of the generating source, as an alternative configuration.

Numeral 213 denotes a discriminating means for discriminating a portion of the subject indicated by the radiographic, digital image data outputted from the input means 210 and for outputting information indicating the portion discriminated to the subsequent photosensor area defining means 215 and to the image processing means 217.

This discriminating means 213 is configured so that the operator directly and manually sets the kind of the portion indicated by the radiographic, digital image data by manipulating the button or the dial or the like provided in the control panel or by manipulating the keyboard or the mouse or the like as an input device of computer.

The radiographic, digital image data is accompanied with the information concerning the portion indicated by the radiographic, digital image data, for example, in DICOM, which is the standards of digital picture communication in the medical treatment field. Therefore, in the case where the radiographic, digital image data outputted from the input means 210 is accompanied with the information concerning the portion indicated by the radiographic, digital image data, the discriminating means 213 may be configured so as to discriminate the portion indicated by the radiographic, digital image data according to the accompanying information and automatically set the kind of the portion as an alternative configuration.

Numeral 214 indicates an output device selecting means for selecting an output device used for outputting the radiographic, digital image data out of a plurality of output devices such as the CRT display device and the film imager device for outputting the data to silver-salt film or the dry printer device and for outputting information indicating a type of an output device selected to the subsequent image processing means 217.

This output device selecting means 214 is configured so that the operator himself directly and manually selects a device used out of the plurality of output devices by manipulating the button or the dial or the like provided in the control panel or by manipulating the keyboard or the mouse or the like.

Alternatively, for example, where the output device to be used is preset based on the information concerning the type of the device outputting the radiographic, digital image data, set in the setting means 212, the output device selecting means 214 may be configured so as to automatically select the output device preliminarily set based on the information concerning the type of the device outputting the radiographic, digital image data, without forcing the operator to directly manually select the type of the device as described above.

Numeral 215 represents a photosensor area defining means having a memory table which stores information concerning locations of photosensors of radiographic, digital image taking apparatus corresponding to types of radiographic, digital image taking apparatus set in the setting means 212, the photosensor area defining means 215 being arranged to read information concerning an image area corresponding to the position of the photosensor on a radiographic, digital image from the memory table, based on the information concerning the type of the device outputting the radiographic, digital image data, set in the setting means 212, and to output the read information to a subsequent weighting means 216.

The photosensor is a sensor for detecting the intensity of radiations radiated during radiography, and the radiographic, digital image taking apparatus is arranged to control irradiation according to the intensity of radiations detected by the photosensor so that exposure during radiography becomes as desired.

For example, where the radiographic, digital image taking apparatus is one for photography of the chest part, the photosensor is located at the position where it touches the chest of the patient being the subject, and the position and shape of the photosensor thus located are visually displayed on a radiation receiving plate in order to allow the operator to guide the patient to a standing position. The operator can control the radiation intensity so that the exposure during radiography is appropriate in the area around the chest and lung of the patient. In this case, the image area corresponding to the position of the photosensor on the radiographic, digital image is coincident with the display.

The information concerning the image area corresponding to the position of the photosensor on the radiographic, digital image, outputted from the photosensor area defining means 215 to the subsequent weighting means 216, is image data corresponding to the image area directly cut out of the radiographic, digital image or information indicating coordinates that represent the position of the image area on the radiographic, digital image.

Incidentally, the image area corresponding to the position of the photosensor on the radiographic, digital image does not always have to be changed among the radiographic devices, but a common area may be employed to the radiographic image taking devices. Further, the image area corresponding to the position of the photosensor on the radiographic, digital image does not always have to coincide perfectly with the shape and position of the photosensor actually disposed, but may have some difference from the actual shape and position.

The aforementioned photosensor area defining means 215 may also be configured so that it is provided with a memory table which stores information concerning locations of photosensors of radiographic, digital image taking apparatus corresponding to kinds of photographing portions discriminated in the discriminating means 213 and the defining means 215 is arranged to read the information concerning the image area corresponding to the position of the photosensor on the radiographic, digital image from the memory table, based on the information concerning the kind of the photographing portion discriminated in the discriminating means 213, and to output the information thus read to the subsequent weighting means 216.

Numeral 216 designates the weighting means for calculating weighted values from the pixel values in the image area, based on the radiographic, digital image data outputted from the above storage means 211 and the information concerning the image area corresponding to the position of the photosensor on the radiographic, digital image indicated by the radiographic, digital image data outputted from the storage means 211, outputted from the photosensor area defining means 215, the weighting means 216 outputting the information concerning the weighted values thus calculated to the subsequent image processing means 217.

Weighting factors used in this weighting means 216 vary toward the center line or the center point of the image area corresponding to the position of the photosensor, for example. FIG. 16 shows an example in which the weighting factors increase toward the center line and FIG. 17 an example in which the weighting factors increase toward the center point. The pixel values of the image area corresponding to the position of the photosensor are multiplied by these weighting factors corresponding thereto. The values obtained all are added up and the result is divided by the sum of the factors to obtain a weighted value.

These weighting factors may be arranged to be large at high-sensitivity portions but small at low-sensitivity portions, corresponding to sensitivity distribution of the photosensor. The weighted value calculated is outputted to the subsequent image processing means 217.

Numeral 217 denotes the image processing means for performing the image processing operation on the radiographic, digital image data stored in the storage means 211 so that the image area corresponding to the position of the photosensor has the optimum density and/or gradation, based on the information indicating the type of the generating source of the radiographic, digital image data, outputted from the setting means 212, the information concerning the portion, outputted from the discriminating means 213, the information indicating the type of the output device, outputted from the output device selecting means 214, and the information of the weighted value or the like of the radiographic, digital image data, outputted from the weighting means 216.

Numeral 218 represents an image output means, which is the output device such as the CRT display device, the film imager device for outputting the data to the silver-salt film, or the dry printer device, or the interface or the like for outputting the radiographic, digital image supplied from the image processing means 217 to the output device connected to the computer network, as described previously. Namely, the image output means 218 itself does not have to be an output device, but the output mens may be constructed, for example, in such structure that the radiographic, digital image data is outputted via the computer network such as Internet to an output device installed at a remote hospital or the like.

Figure 18:
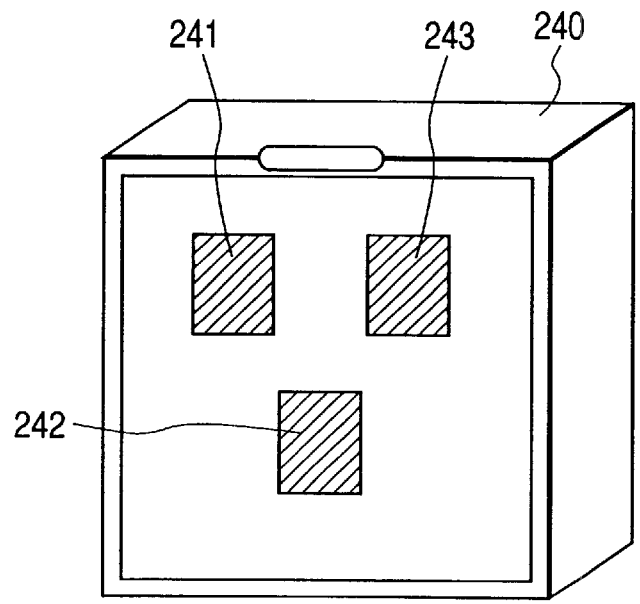
FIG. 18 is a diagram for explaining the set positions of the photosensors in the radiographic image taking apparatus in the radiographic, digital image processing system illustrated in FIG. 15.

Now, the operation of this radiographic, digital image processing system will be described, using an example in which the chest part is photographed using the radiographic, digital image taking device as illustrated in FIG. 18 and in which the radiographic, digital image photographed is outputted in a printed form on a film.

In FIG. 18, numeral 240 denotes a chest contact plate of the radiographic, digital image taking apparatus to be in contact with the chest part of the patient being the subject, and the photosensors for detecting the X-ray intensity are located in the illustrated areas 241, 242, 243 on the back surface of the chest contact plate 240.

First, the radiographic, digital image data corresponding to the radiographic image of the chest part of the patient, outputted from the input means 210 having the radiographic, digital image taking apparatus with the photosensors 241 to 243 located at the positions illustrated in FIG. 18, is sent to the storage means 211 and stored in the semiconductor memory, the hard-disk drive device, or the like.

On the other hand, when the chest part of the patient is photographed by the radiographic, digital image taking apparatus of the above-stated type, the photosensor area defining means 215 reads the information concerning the image areas corresponding to the positions of the photosensors in the radiographic, digital image taking apparatus used for photography, i.e., the information indicating the image areas corresponding to the two photosensors 241 and 243 of FIG. 18, from the memory table storing the information concerning the locations of the photosensors of radiographic, digital image photographing apparatus, according to the information concerning the type of the device outputting the radiographic, digital image data, set in the setting means 212, and outputs the information to the weighting means 216.

The weighting means 216 calculates the weighted value A by multiplying the pixel values in the image areas corresponding to the positions of the photosensors, out of the radiographic, digital image data supplied from the storage means 211, by the factors corresponding to the sensitivity distribution of the photosensors, and outputs the result to the image processing means 217.

In the case of this operational example, because the system is so arranged that the setting means 212 sets the type of the radiographic, digital image taking device used for photography, the discriminating means 213 discriminates the chest part as a photographing portion, and the output device selecting means 214 selects the film imager device as an output device, the image processing means 217 performs the density conversion operation based on the density conversion table having such density conversion characteristics that the weighted value A supplied from the weighting means 216 becomes the optimum density value D on the film finally outputted from the film imager device.

Figure 19:
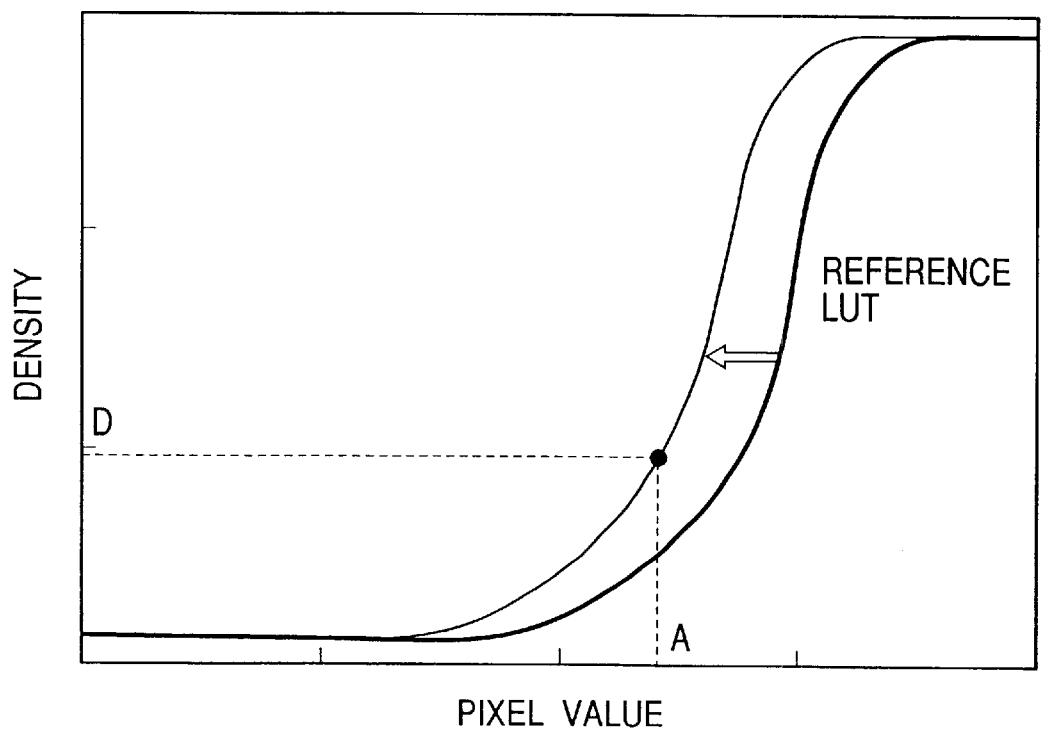
FIG. 19 is a characteristic diagram for explaining correction of a density conversion curve.

The image processing means 217 is equipped with the look-up table (hereinafter abbreviated simply as LUT) storing plural data pieces for respective photographing portions, each data piece indicating a density conversion curve as a reference for the density conversion operation. First, the image processing means 217 reads from the LUT the data concerning the density conversion curve corresponding to the photographing portion discriminated in the discriminating means 213. Namely, in the case of this operational example, the data indicating the density conversion curve for the "chest part" having the density conversion characteristics as indicated by the thick solid line in FIG. 19, is automatically read from the LUT.

Then the image processing means 217 moves the density conversion curve indicated by the data read out of the LUT in parallel so that the weighted value A calculated in the weighting means 216 becomes the density value D. This compensates the density conversion curve to that actually used in the density conversion operation (indicated by the thin solid line in FIG. 19).

Then the image processing means 217 carries out the density conversion operation based on the above corrected density conversion curve for the radiographic, digital image data of the photograph of the chest part outputted from the storage means 211 and thereafter supplies the radiographic, digital image data thus processed to the image output means 218.

The image output means 218 can thus form a digital, radiographic image in the optimum density on the film by printing the digital, radiographic image on the film with laser intensities corresponding to pixel values indicated by the digital, radiographic image data supplied from the image processing means 217.

The operational example described above was explained as an example where the photographing portion was the "chest", but, for example in the case where the photographing portion is the "abdominal part", the system may be arranged so that the weighted value is computed from all the three image areas corresponding to the photosensors 241 to 243 of FIG. 18 and the density conversion operation is carried out based on the characteristic amount thus computed.

In another case where the photographing portion is either of the "extremities", the system may be arranged so that the weighted value is computed from only the image area corresponding to the position of one photosensor 242 of FIG. 18 and the density conversion operation is carried out based on the characteristic amount thus computed. Further, in this case, the radiographic, digital image taking device having all the photosensors 241 to 243 located does not have to be used, but the radiography can also be performed by a radiographic, digital image taking device having only the photosensor 242.

Next described is a storage medium as another embodiment of the present invention.

When the system composed of the blocks of FIG. 15 is comprised of a computer system including the CPU and memory, this memory constitutes the storage medium according to the present invention. This storage medium stores a program for carrying out the processing procedures for controlling the above-stated operation.

The storage medium may be selected from a semiconductor memory such as an ROM or an RAM, an optical disk, a magnetooptical disk, a magnetic medium, and so on, which may be used in the form of a CD-ROM, a floppy disk, a magnetic medium, a magnetic card, a non-volatile memory card, or the like.

Accordingly, this storage medium can be used in another system or apparatus except for the system and apparatus described above in FIG. 15 and the system or computer can read the program code stored in this storage medium to carry out the program, whereby the function and effect equivalent to those in the above embodiment can be implemented, thereby accomplishing the object of the present invention.

The function and effect equivalent to those in the above embodiment can also be implemented so as to accomplish the object of the present invention in the case where the OS or the like operating on the computer executes a part or the whole of the processing or in the case where the program code read out of the storage medium is first written into a memory provided in an extended function board put in the computer or in an extended function unit connected to the computer and thereafter, based on instructions of the program code, the CPU or the like in the above extended function board or in the extended function unit carries out a part or the whole of the processing.

As described above, the present embodiment can provide the radiographic, digital image processing system capable of automatically performing the optimum image processing operation on a portion of the subject in the radiographic, digital image without troubling the operator.

Fourth Embodiment

The present invention will be described in detail, based on the radiographic, digital image processing system as a fourth embodiment of the present invention.

Figure 20:
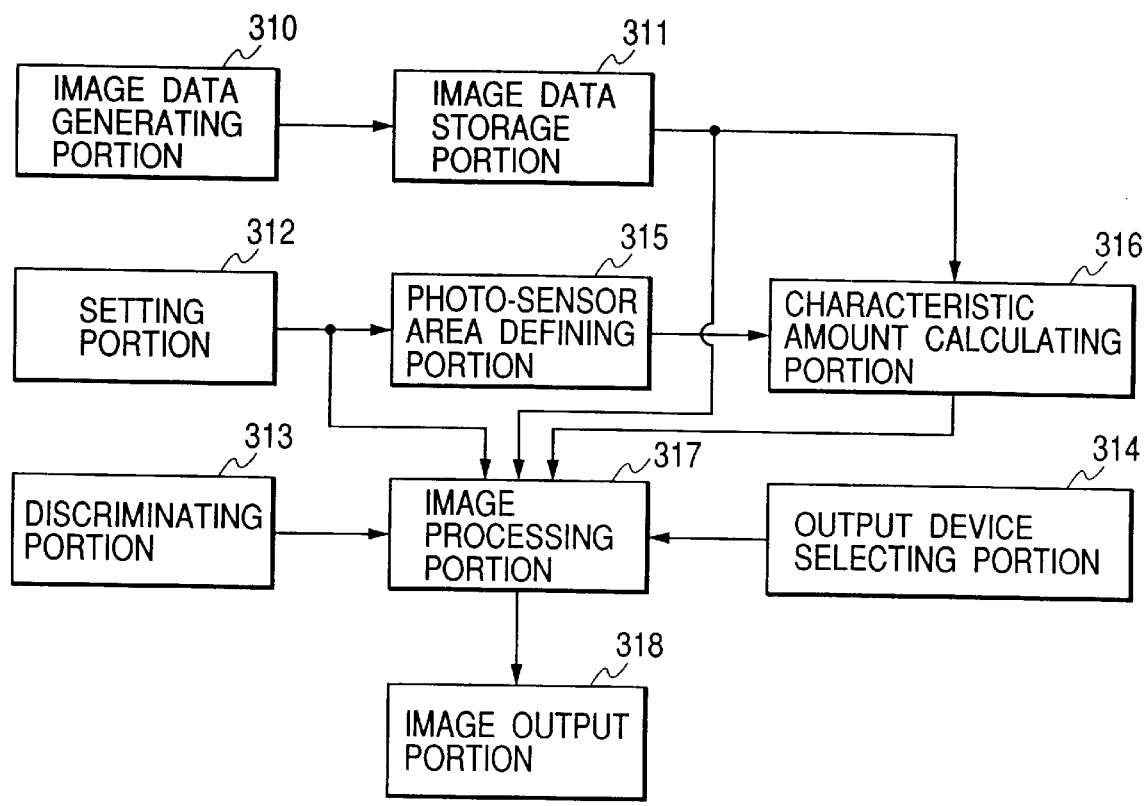
FIG. 20 is a block diagram to show the schematic structure of a radiographic, digital image processing system as a fourth embodiment of the present invention.

FIG. 20 is a diagram to show the schematic structure of the radiographic, digital image processing system as the fourth embodiment of the present invention.

In FIG. 20, reference numeral 310 designates an image data generating portion for generating radiographic, digital image data, which is, for example, a radiographic image taking apparatus arranged in such structure that radiations such as X-rays are radiated onto the subject, a radiographic image as a transmitted image thereof is picked up directly by a solid state image sensing device, and the apparatus outputs radiographic, digital image data corresponding to the radiographic image thus picked up. In addition to the above radiographic image taking apparatus, the image data generating portion 310 may be either one selected from a radiographic image reading device for reading a radiographic image accumulated and stored in a photo-stimulable phosphor sheet, a radiographic image taking device for radiating radiations to the subject, receiving the radiographic image of the transmitted image thereof on a fluorescent plate, and converting the received image on the fluorescent plate to radiographic, digital image data by the solid state image sensing device, an input interface for capturing the radiographic, digital image data supplied from a radiographic image taking device connected to a computer network, and so on. Namely, the image data generating portion 310 itself does not have to be a radiographic image taking device, but this portion 310 may also be constructed, for example, in such structure that the radiographic image data representing the radiographic image taken by the radiographic image taking device installed at a hospital or the like in a remote place is inputted through the computer network such as Internet into this radiographic, digital image processing system.

Numeral 311 denotes an image data storage portion for storing the radiographic, digital image data supplied from the image data generating portion 310, the image data storage portion 311 being comprised, for example, of a semiconductor memory, a hard-disk drive device, or the like into which data can be written at high speed.

Numeral 312 represents a setting portion for setting a type of a device outputting the radiographic, digital image data in the image data generating portion 310 and for outputting information data indicating the type of the device thus set to a subsequent photosensor area defining portion 315 and to a subsequent image processing portion 317. The setting portion 312 is configured so that the operator himself directly manually sets the type of the device outputting the radiographic, digital image data by manipulating the button or the dial or the like provided in the control panel or by manipulating the keyboard or the mouse or the like as an input device of computer. The radiographic, digital image data is accompanied with information concerning a device generating the radiographic, digital image data, for example, in DICOM, which is the standards of digital picture communication in the medical treatment field. Therefore, in the case where the radiographic, digital image data outputted from the image data generating portion 310 or from the image data storage portion 311 is accompanied with the information concerning the device generating the radiographic, digital image data, the setting portion 312 is configured so as to discriminate the type of the device outputting the radiographic, digital image data according to the accompanying information and automatically set the type of the device.

Numeral 313 denotes a discriminating portion for discriminating a kind of a portion indicated by the radiographic, digital image data outputted from the image data generating portion 310 and for outputting information data indicating the kind of the portion thus discriminated to the subsequent image processing portion 317. The discriminating portion 313 is configured so that the operator himself directly and manually sets the kind of the portion indicated by the radiographic, digital image data by manipulating the button or the dial or the like provided in the control panel or by manipulating the keyboard or the mouse or the like as an input device of computer. The radiographic, digital image data is accompanied with the information concerning the kind of the portion indicated by the radiographic, digital image data, for example, in DICOM, which is the standards of digital picture communication in the medical treatment field. Therefore, in the case where the radiographic, digital image data outputted from the image data generating portion 310 is accompanied with the information concerning the kind of the portion indicated by the radiographic, digital image data, the discriminating portion 313 is configured so as to discriminate the kind of the portion indicated by the radiographic, digital image data according to the accompanying information and automatically set the kind of the portion.

Numeral 314 indicates an output device selecting portion for selecting an output device used for outputting the radiographic, digital image data out of a plurality of output devices such as the CRT display device and the film imager device or the dry printer device and for outputting information indicating a type of an output device selected to the subsequent image processing portion 317. The output device selecting portion 314 is configured so that the operator himself directly and manually selects a device used out of the plurality of output devices by manipulating the button or the dial or the like provided in the control panel or by manipulating the keyboard or the mouse or the like as an input device of computer. For example, where the output device to be used is preset based on the information concerning the type of the device outputting the radiographic, digital image data, set in the setting portion 312, the output device selecting portion 314 is configured so as to automatically select the output device preliminarily set based on the information concerning the type of the device outputting the radiographic, digital image data, without forcing the operator himself to directly manually select the type of the device by manipulating the button, the dial, or the like as described above.

Numeral 315 represents a photosensor area defining portion having a memory table which stores information concerning an image area corresponding to the location, size, shape, etc. of the photosensor of radiographic, digital image taking apparatus corresponding to types of radiographic, digital image taking apparatus set in the setting portion 312, the photosensor area defining portion 315 being arranged to read information concerning an image area corresponding to the location, size, shape, etc. of the photosensor on the radiographic, digital image from the memory table, based on the information concerning the type of the device outputting the radiographic, digital image data, set in the setting portion 312, and to output the read information to a subsequent characteristic amount calculating portion 316.

The photosensor is a sensor for detecting the intensity of radiations radiated during radiography, and the radiographic image taking apparatus is arranged to control the radiant intensity of radiations according to the intensity of radiations detected by the photosensor so that the exposure during radiography becomes as desired.

For example, in the case where the radiographic image taking apparatus is one for photography of the chest part, the photosensor is located at the position where it touches the chest of the patient being the subject, and the position and shape of the photosensor thus located are visually displayed on a radiation receiving plate in order to allow the operator to guide the patient to a standing position. The operator adjusts the standing position of the patient so that the chest of the patient touches the display. Then the operator photographs the chest of the patient, whereby the radiant intensity of radiations can be controlled so that the exposure during radiography is appropriate in the area around the lung.

Figure 21:
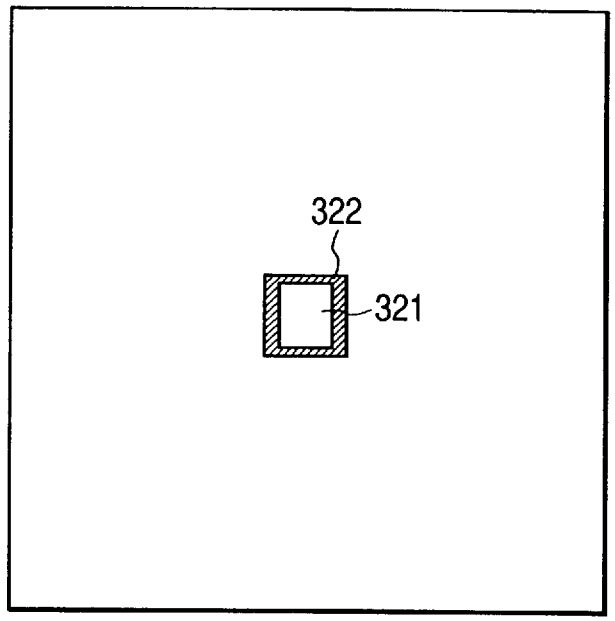
FIG. 21 is a diagram for explaining the set position of the photosensor in the radiographic image taking apparatus for photography of the abdominal part in the radiographic, digital image processing system illustrated in FIG. 20.

When the radiographic image apparatus is one for photography of the abdominal part, as illustrated in FIG. 21, a photosensor is located at a position where it touches the abdomen of the patient being the subject (indicated by 321 in the figure) and a display is given to show an image area (for example, a rectangular area 40 mm wide and 40 mm long indicated by 322 in the figure) to visually indicate the position and shape of the photosensor placed on the radiation receiving plate in order to permit the operator to guide the patient to the standing position. After the operator adjusts the standing position of the patient so that the abdomen of the patient touches the display, the operator carries out photography. Therefore, the radiant intensity and time of radiations can be controlled so that the exposure during radiography becomes appropriate in the area around the abdomen.

Figure 22:
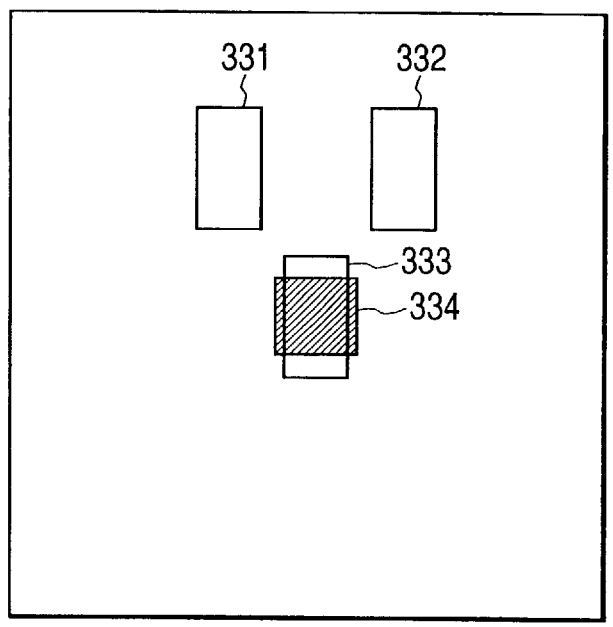
FIG. 22 is a diagram for explaining the set positions of the photosensors in the radiographic image taking apparatus for photography of the chest part in the radiographic, digital image processing system illustrated in FIG. 20.

In the above-stated case, the image area corresponding to the position of the photosensor on the radiographic, digital image is coincident with the display. However, the radiographic image device for photography of the chest part may also be arranged as illustrated in FIG. 22. In the apparatus of FIG. 22, in order to make it easier for the operator to guide the patient to the standing position, on the radiation receiving plate, on which the chest of the patient being the subject is placed, there are displays of image areas to visually indicate positions and shapes of rectangular photosensors 50 mm wide and 90 mm long, one at a position on the center line of the receiving plate (333 in the figure) and two at positions 20 mm apart each from the center line (331, 332 in the figure), and a photosensor located at a position (334 in the figure) overlapping with the image area 333 of the photosensor. After the operator adjusts the standing position of the patient so that the abdomen of the patient touches the displays, the operator carries out photography. The radiant intensity and time of radiations are controlled so that the exposure during radiography becomes proper in the area around the abdomen. In this apparatus, all the image areas indicating the positions of photosensors on the radiographic, digital image do not coincide with the image area of the photosensor actually set, and no photosensor is actually set in the image areas of 331, 332 in the figure. This apparatus may be used for the photography.

Namely, radiographic technicians, who are operators of the radiographic, digital image processing system, are guided to take a photograph in such a state that the part of the patient to be photographed is placed on the display of location of the photosensor on the occasion of radiography. It is thus normal practice to carry out radiography after leading the patient so that the part of the patient being the subject is coincident with the position where the photosensor is located. In the radiographic, digital image processing system of the embodiment of the present invention, the image processing is carried out so as to optimize the density and/or the gradation in the image area corresponding to the location of the photosensor on the radiographic, digital image by making use of the characteristic amount of the image area corresponding to the location, size, shape, etc. of the photosensor used heretofore in the radiographic apparatus, irrespective of whether photography is carried out using the photosensor, on the occasion of determining the processing conditions in the image processing operation such as the density and/or gradation processing for the radiographic, digital image photographed.

The information concerning the image area corresponding to the location, size, shape, etc. of the photosensor on the radiographic, digital image outputted from the above photosensor area defining portion 315 to the characteristic amount calculating portion 316, is image data corresponding to the image area directly cut out of the radiographic, digital image or information data indicating coordinates that represent the position of the image area on the radiographic, digital image.

Incidentally, the image area corresponding to the location, size, shape, etc. of the photosensor on the radiographic, digital image does not always have to be changed among the radiographic devices, but a common area may be employed to the radiographic image taking devices. Further, the image area corresponding to the location, size, shape, etc. of the photosensor on the radiographic, digital image does not always have to coincide perfectly with the shape and position of the photosensor actually disposed, but may have some difference from the actual shape and position.

The aforementioned photosensor area defining portion 315 may also be configured so that it is provided with a memory table which stores information concerning the location, size, shape, etc. of photosensor of the radiographic, digital image taking apparatus corresponding to kinds of photographing portions discriminated in the discriminating portion 313 and the defining portion 315 is arranged to read the information concerning the image area corresponding to the location, size, shape, etc. of the photosensor on the radiographic, digital image from the memory table, based on the information concerning the kind of the photographing portion discriminated in the discriminating portion 313, and to output the information thus read to the subsequent characteristic amount calculating portion 316.

Numeral 316 designates the characteristic amount calculating portion for selecting as a characteristic amount at least either one of the maximum, the minimum, the average, the median, the mode, and the like of pixel values in the image area and calculating information concerning the characteristic amount based on the radiographic, digital image data outputted from the image storage portion 311 and the information data concerning the image area corresponding to the location, size, shape, etc. of the photosensor on the radiographic, digital image indicated by the radiographic, digital image data outputted from the image storage portion 311, outputted from the photosensor area defining portion 315, the characteristic amount calculating portion 316 outputting the information data concerning the characteristic amount thus calculated to the subsequent image processing portion 317.

When there are plural (three) image areas corresponding to positions of photosensors as in the case where the photographing portion is the chest part of the patient, the characteristic amount calculating portion 316 may be configured, for example, to calculate the maximum and minimum, or the average of each of the three image areas as the information data concerning the characteristic amount and output the information data calculated to the subsequent image processing portion 317.

Numeral 317 denotes the image processing portion for performing the image processing operation to compress the dynamic range of the radiographic, digital image data stored in the image storage portion 311 so that the image area corresponding to the position of the photosensor has the optimum density and/or gradation, based on the information indicating the type of the radiographic apparatus, outputted from the setting portion 312, the information concerning the photographing portion, outputted from the discriminating portion 313, the information indicating the type of the output device, outputted from the output device selecting portion 314, and the information concerning the characteristic amount of the radiographic, digital image, outputted from the characteristic amount calculating portion 316.

Numeral 318 represents an image output portion, which is the output device such as the CRT display device, the film imager device, or the dry printer device, or the interface or the like for outputting the radiographic, digital image supplied from the image processing portion 317 to the output device connected to the computer network, as described previously. Namely, the image output portion 318 itself does not have to be an output device, but the output portion may be constructed, for example, in such structure that the radiographic image data is supplied via the computer network such as Internet to an output device installed at a remote hospital or the like.

Now, the operation of this radiographic, digital image processing system will be described in detail, using an example in which the front or the side of the chest part of the patient is photographed using the radiographic, digital image taking device having the photosensors at the positions illustrated in FIG. 22 and in which the radiographic, digital image photographed is outputted in a printed form on a film.

First, the radiographic, digital image data corresponding to the radiographic image of the front or the side of the chest part, outputted from the image data generating portion 310 having the radiographic, digital image taking apparatus with the photosensor at the position indicated by 334 in FIG. 22, is sent to the image data storage portion 311 and stored in the semiconductor memory, the hard-disk drive device, or the like.

On the other hand, when the front or the side of the chest part of the patient is photographed by the radiographic, digital image taking apparatus of the above-stated type, the photosensor area defining portion 315 reads the information concerning the image area corresponding to the location, size, shape, etc. of the photosensor in the radiographic, digital image taking apparatus used for photography (i.e., the information indicating the image areas of 331, 332, 333 in FIG. 22), from the memory table storing the information concerning the image area corresponding to the location, size, shape, etc. of the photosensor of radiographic, digital image photographing apparatus, according to the information concerning the type of the device outputting the radiographic, digital image data, set in the setting portion 312, and outputs it to the characteristic amount calculating portion 316.

The characteristic amount calculating portion 316 cuts each of the image areas corresponding to the positions of the photosensors according to the information outputted from the photosensor area defining portion 315, out of the radiographic, digital image data supplied from the image data storage portion 311, calculates an average of pixel values in each image area thus cut out (in this example, an average of pixel values in the image area of 333 in FIG. 22 will be called Cave, an average of pixel values in the image area of 332 Rave, and an average of pixel values in the image area of 331 Lave), and outputs data indicating these values to the image processing portion 317.

In the case of this operational example, because the system is so arranged that the setting portion 312 sets the type of the radiographic, digital image taking device used for photography, the discriminating portion 313 discriminates the front or the side of the chest part as a photographing portion, and the output device selecting portion 314 selects the film imager device as an output device, the image processing portion 317 carries out such processing as to effect optimum dynamic range compression, using the data indicating the averages supplied from the characteristic amount calculating portion 316.

Figure 23:
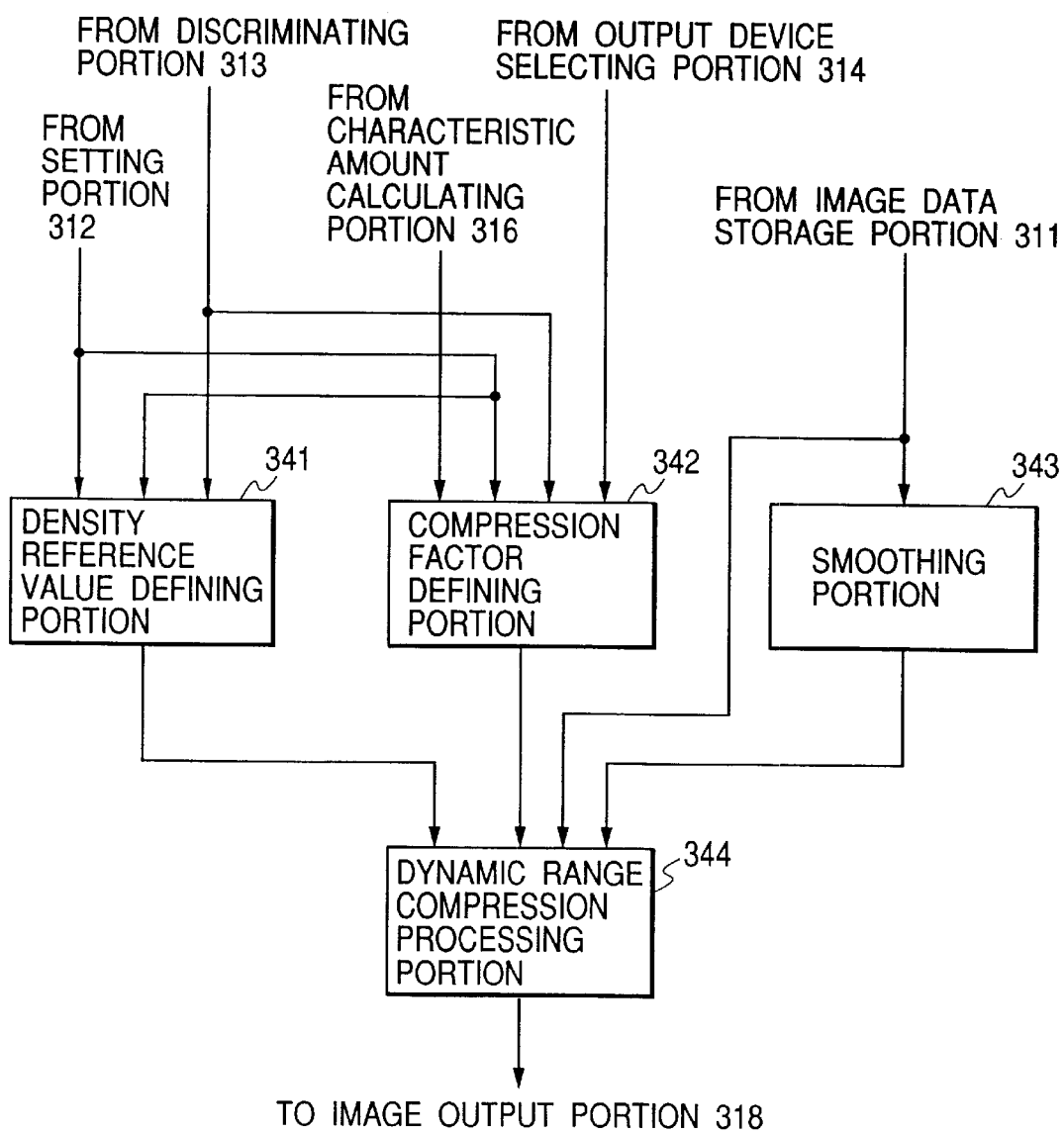
FIG. 23 is a diagram to show an example of the schematic structure of the image processing portion in the radiographic, digital image processing system illustrated in FIG. 20.

FIG. 23 is a diagram to show an example of the schematic structure of the image processing portion 317.

As illustrated in FIG. 23, the image processing portion 317 is composed of a density reference value defining portion 341 for defining a density reference value used in the dynamic range compression operation and generating data to indicate the density reference value determined, a compression factor defining portion 342 for defining a compression factor and generating data to indicate the compression factor determined, a smoothing portion 343 for smoothing the radiographic, digital image indicated by the radiographic, digital image data supplied from the image data storage portion 311 and generating data to indicate the radiographic, digital image thus smoothed, and a dynamic range compression processing portion 344 for performing the operation of compressing the dynamic range of the radiographic, digital image indicated by the radiographic, digital image data supplied from the image data storage portion 311, based on the data to indicate the density reference value, the data to indicate the compression factor, and the data to indicate the smoothed image, supplied from the respective portions.

Figure 24:
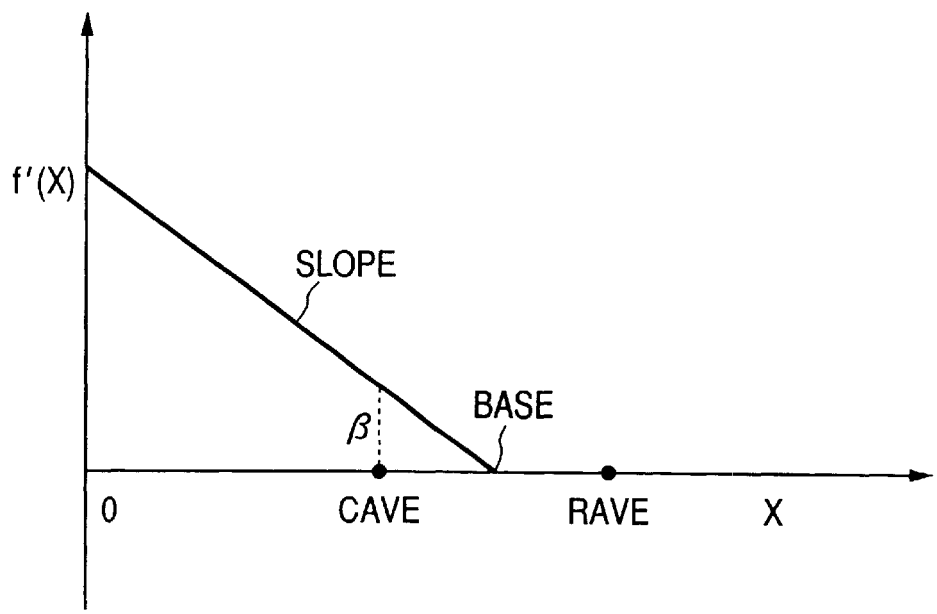
FIG. 24 is an explanatory diagram to explain the pixel density conversion characteristics on the occasion of photography of the front of the chest part.

In the image processing portion 317, when the front of the chest is discriminated as a photographing portion in the discriminating portion 313, the density reference value defining portion 341 defines as a density reference value (BASE in FIG. 24) on the function curve illustrated in FIG. 24, a value represented by "Cave+(Rave−Cave)×α (where α is an arbitrary constant set according to the information concerning the type of the device outputting the radiographic, digital image data, set in the setting portion 312)", which is located between the average Cave and the average Rave supplied from the characteristic amount calculating portion 316. The density reference value may be a value represented by "Cave+(Lave−Cave)×α", which is located between the average Cave and the average Lave supplied from the characteristic amount calculating portion 316 or may be a value smaller than the average Cave.

Then the compression factor defining portion 342 defines as a compression factor (SLOPE in the figure) on the function curve illustrated in FIG. 24, a value represented by "Cave×β/{(Rave−Cave)×α} (where β is an arbitrary constant set according to the information concerning the type of the output device for outputting the radiographic, digital image data, set in the output device selecting portion 314)" by which pixel values of the image area indicating the average Cave, supplied from the characteristic amount calculating portion 316, on the radiographic, digital image after the dynamic range compression operation, are increased by the predetermined value β with respect to the density reference value determined in the density reference value defining portion 341.

The smoothing portion 343 moves a mask of the size having M pixels×M pixels (M is an arbitrary constant) on the radiographic, digital image indicated by the radiographic, digital image data supplied from the image data storage portion 311 and smooths the radiographic, digital image by obtaining an average of pixel values present in the mask at each moving portion and replacing the pixel values used for obtaining the average with the average thus obtained. The smoothing portion 343 generates data indicating the radiographic, digital image thus smoothed or generates data indicating the radiographic, digital image smoothed by use of a morphological filter.

Let $S'_{org}$ represent the pixel values of the radiographic, digital image indicated by the radiographic, digital image data supplied from the image data storage portion 311, $S'_{US}$ represent the pixel values of the averaged, radiographic, digital image indicated by the data to represent the smoothed image supplied from the smoothing portion 343, $S'_D$ represent the pixel values of the radiographic, digital image after the dynamic range compression operation, and the function f'(x) represent the function curve representing the pixel density value conversion characteristics as illustrated in FIG. 24 with the parameters of the data representing the density reference value (BASE) obtained from the density reference value defining portion 341 and the data representing the compression factor obtained from the compression factor defining portion 342. Then the dynamic range compression processing portion 344 executes the operation of compressing the dynamic range of the radiographic, digital image indicated by the radiographic, digital image data supplied from the image data storage portion 311 according to the following arithmetic of Eq. (3).

$$S'_D = S'_{org} + f'(S_{US}) \quad (3)$$

Therefore, the dynamic range compression processing portion 344 can carry out the operation of compressing the dynamic range of the radiographic, digital image indicated by the radiographic, digital image data supplied from the image data storage portion 311, according to the dynamic range compression characteristics arbitrarily set according to the photographing portion.

Figure 25:
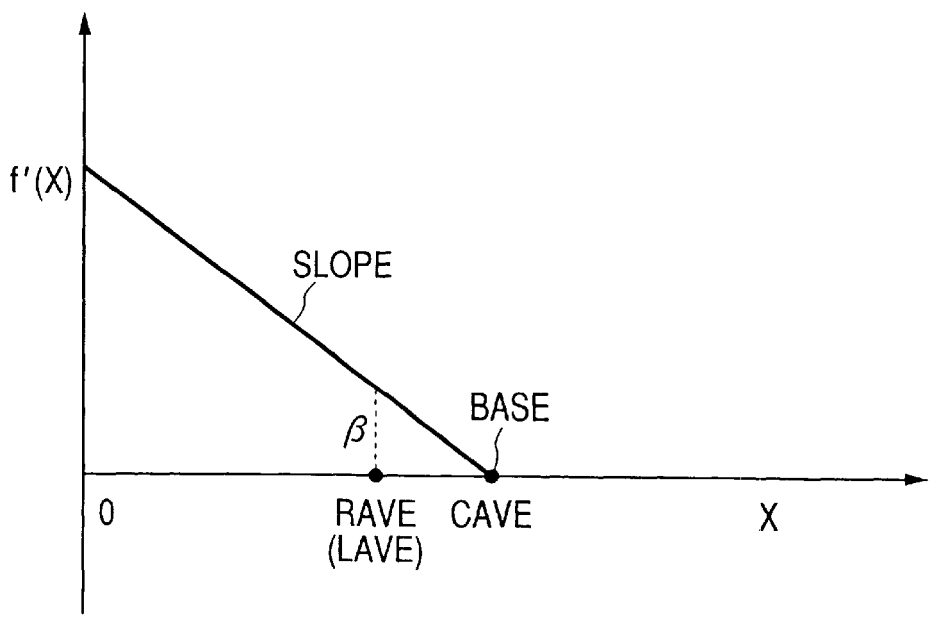
FIG. 25 is an explanatory diagram to explain the pixel density conversion characteristics on the occasion of photography of the side of the chest part.

In the above image processing portion 317, when the side of the chest is discriminated as a photographing portion in the discriminating portion 313, the density reference value defining portion 341 defines as a density reference value (BASE in FIG. 25) on the function curve illustrated in FIG. 25, the average Cave supplied from the characteristic amount calculating portion 316, multiplied by α, Cave×α, (α is an arbitrary constant set according to the information concerning the type of the device outputting the radiographic, digital image data, set in the setting portion 312), and the compression factor defining portion 342 defines as a compression factor (SLOPE in the figure) on the function curve illustrated in FIG. 25, a value represented by "Rave×β/{(Cave−Rave)×α} (β is an arbitrary constant set according to the information concerning the type of the output device for outputting the radiographic, digital image data, set in the output device selecting portion 314)" by which pixel values of the image area indicating the average Rave or the average Lave, supplied from the characteristic amount calculating portion 316, on the radiographic, digital image after the dynamic range compression processing operation, are increased by the predetermined value β with respect to the density reference value defined in the density reference value defining portion 341. After that, the image processing portion carries out the like operation as in the case of the photographing portion being the front of the chest as described above, whereby the image processing portion can execute the processing operation of compressing the dynamic range of the radiographic, digital image indicated by the radiographic, digital image data supplied from the image data storage portion 311, according to the dynamic range compression characteristics arbitrarily set according to the photographing portion.

Figure 26:
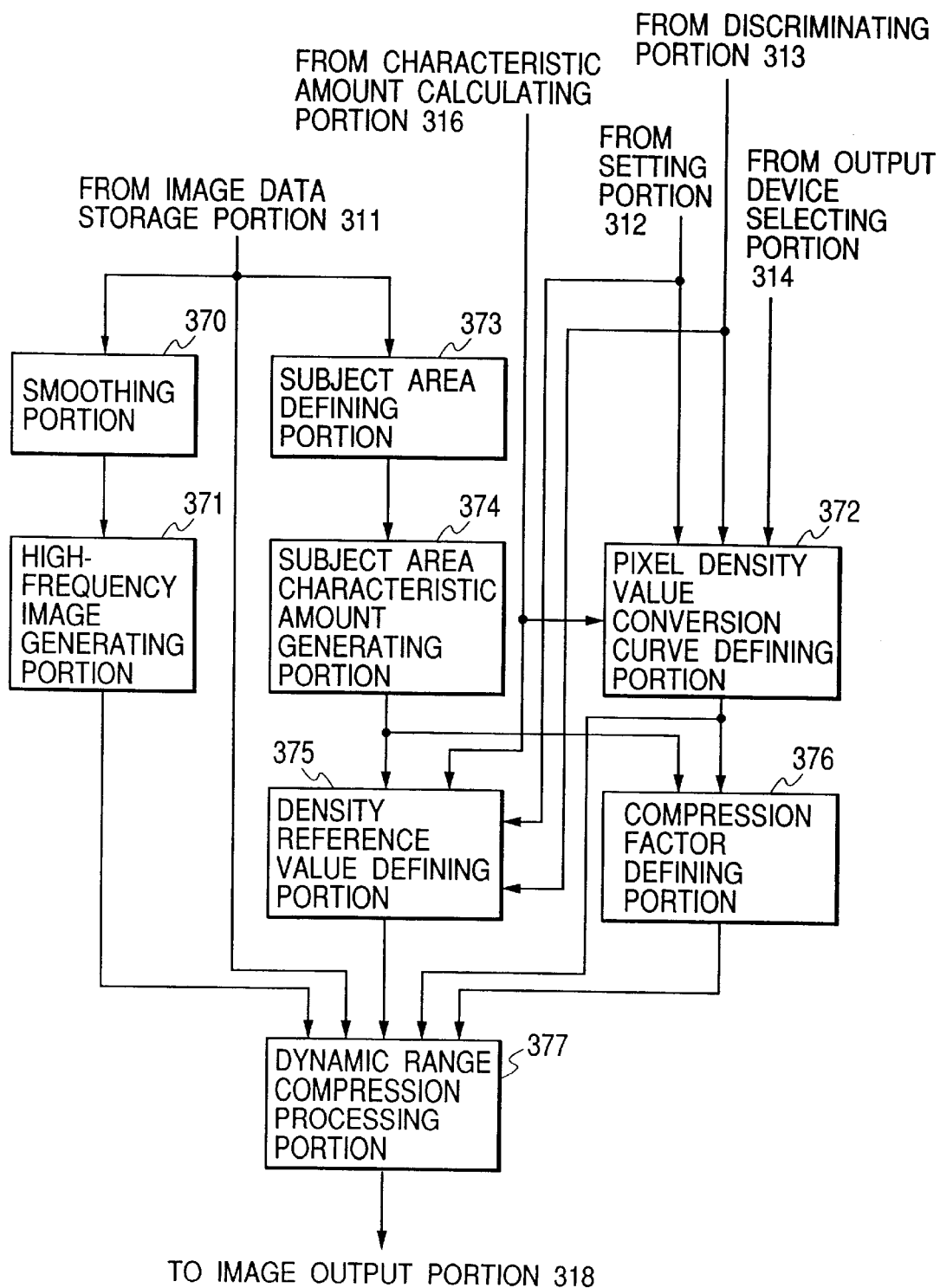
FIG. 26 is a diagram to show another example of the schematic structure of the image processing portion in the radiographic, digital image processing system illustrated in FIG. 20.

FIG. 26 is a diagram to show another example of the schematic structure of the image processing portion 317.

As illustrated in FIG. 26, the image processing portion 317 is composed of a smoothing portion 370 for smoothing the radiographic, digital image indicated by the radiographic, digital image data supplied from the image data storage portion 311 and generating data to indicate the smoothed, radiographic, digital image, a high-frequency image generating portion 371 for generating data to indicate an image of high-frequency components in the radiographic, digital image indicated by the radiographic, digital image data supplied from the image data storage portion 311, using the radiographic, digital image data supplied from the image data storage portion 311 and the data to indicate the smoothed image, obtained from the smoothing portion 370, a pixel density value conversion curve defining portion 372 provided with a memory table preliminarily storing function data representing pixel density value conversion characteristics respectively corresponding to types of radiographic devices, photographing portions, and types of output devices, the pixel density value conversion curve defining portion 372 selecting function data representing the pixel density value conversion characteristics according to the information representing the type of the radiographic device, outputted from the setting portion 312, the information concerning the photographing portion, outputted from the discriminating portion 313, and the information representing the type of the output device, outputted from the output device selecting portion 314, from the memory table, adjusting a pixel density value conversion curve indicated by the selected function data to desired characteristics, and outputting data to indicate a pixel density value conversion curve as adjusted, a subject area defining portion 373 for defining a subject area excluding the through portion (an area in which radiations impinge directly on the sensor or the like without passing the subject) in the radiographic, digital image indicated by the radiographic, digital image data supplied from the image data storage portion 311 and generating data to indicate the subject area thus defined, a subject area characteristic amount generating portion 374 for generating data to indicate a characteristic amount of the subject area, based on the data indicating the subject area supplied from the subject area defining portion 373, a density reference value defining portion 375 for defining a density reference value (BASE) used in the dynamic range compression processing operation, based on the data to indicate the characteristic amount of the subject area, supplied from the subject area characteristic amount generating portion 374, and generating data to indicate the density reference value thus defined, a compression factor defining portion 376 for defining a compression factor (R), based on the data to indicate the pixel density value conversion curve, the data to indicate the density reference value, and the data to indicate the characteristic amount of the subject area, obtained from the respective portions, and generating data to indicate the compression factor thus defined, and a dynamic range compression processing portion 377 for carrying out the processing operation for compressing the dynamic range of the radiographic, digital image indicated by the radiographic, digital image data supplied from the image data storage portion 311, based on the data to indicate the density reference value, the data to indicate the compression factor, and the data to indicate the image of high-frequency components, obtained from the respective portions.

Figure 27:
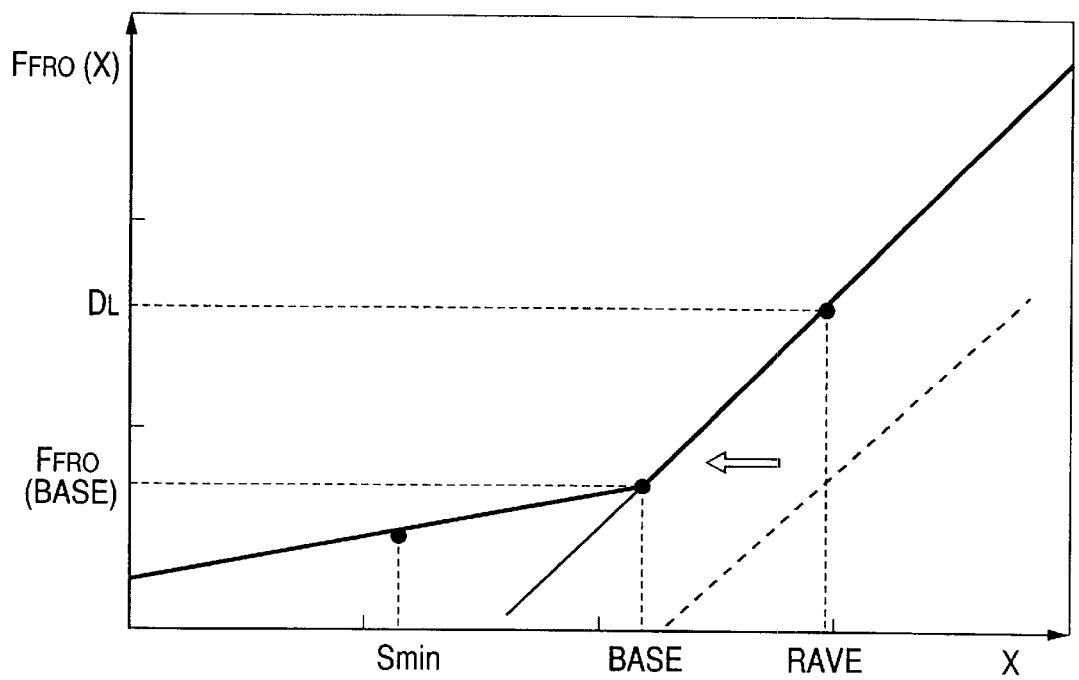
FIG. 27 is an explanatory diagram to explain the pixel density conversion characteristics on the occasion of photography of the front of the chest part.

In the image processing portion 317, when the front of the chest is discriminated as a photographing portion in the discriminating portion 313, the pixel density value conversion curve defining portion 372 first selects function data to indicate pixel density value conversion characteristics (curve) as indicated by the dashed line in FIG. 27, according to the information indicating the type of the radiographic device (i.e., the information indicating the radiographic, digital image taking device), outputted from the setting portion 312, the information concerning the photographing portion (i.e., the information indicating the front of the chest), outputted from the discriminating portion 313, and the information indicating the type of the output device (i.e., the information indicating the film imager device), outputted from the output device selecting portion 314, from the memory table preliminarily storing the function data to indicate the pixel density value conversion characteristics respectively corresponding to the types of radiographic devices, photographing portions, and types of output devices.

On the other hand, the pixel density value conversion curve defining portion 372 receives the data indicating the averages Cave, Rave, Lave supplied from the characteristic amount calculating portion 316, then adjusts the pixel density value conversion curve by moving it in parallel in the direction indicated by the arrow in FIG. 27 up to the position indicated by the thin line in FIG. 27 so that the average Rave (or the average Lave) becomes a desired density value $D_L$ of the pulmonary field preliminarily set, on the pixel density value conversion curve as indicated by the dashed line in FIG. 27, and outputs data to indicate the pixel density value conversion curve thus adjusted, $F_{FRO}(X)$, to the compression factor defining portion 376 and to the dynamic range compression processing means 377.

The subject area defining portion 373 separates the subject area, which is a transmitted image of the subject excluding the through area where radiations impinge directly on the sensor or the like without passing the subject, from the radiographic image indicated by the radiographic, digital image data supplied from the image data storage portion 311, and outputs information data to indicate the subject area thus separated to the subsequent subject area characteristic amount generating portion 374.

Then the subject area characteristic amount generating portion 374 generates a minimum pixel density value $S_{min}$ in the subject area, based on the information data to indicate the subject area supplied from the subject area defining portion 373, and outputs data to indicate the minimum pixel density value $S_{min}$ thus generated as data to indicate a characteristic amount of the subject area to the compression factor defining portion 376.

The density reference value defining portion 375 receives the data indicating the averages Cave, Rave, Lave supplied from the characteristic amount calculating portion 316, calculates the density reference value (BASE) according to Eq. (4) below, and outputs data to indicate the density reference value (BASE) thus calculated to the compression factor defining portion 376 and to the dynamic range compression processing portion 377.

$$BASE=Cave+(Rave-Cave)\times\alpha \qquad (4)$$

In above Eq. (4) α is an arbitrary constant set according to the information concerning the type of the device outputting the radiographic, digital image data, set in the setting portion.

The compression factor defining portion 376 receives the data indicating the adjusted pixel density value conversion curve $F_{FRO}(X)$ indicated by the thin line in FIG. 27, supplied from the pixel density value conversion curve defining portion 372, the data indicating the minimum pixel density value $S_{min}$ as a characteristic amount of the subject area from the subject area characteristic amount generating portion 374, and the data indicating the density reference value (BASE) from the density reference value defining portion 375. Then the compression factor defining portion 376 calculates the compression factor (R) according to Eq. (5) below, based on the data supplied from the respective portions, and outputs data to indicate the compression factor (R) thus calculated to the dynamic range compression processing portion 377.

$$R=\{F_{FRO}(BASE)-D_{min}\}/(Base-S_{min}) \qquad (5)$$

In above Eq. (5), $D_{min}$ indicates the minimum pixel density value after the dynamic range compression processing operation, which is a desired value arbitrarily determined, for example, in the range of "0.2" to "0.5".

As described above, the normal image density value conversion curve for the photographic image of the front of the chest preliminarily stored in the memory table in the pixel density value conversion curve defining portion 372 can be modified to obtain the pixel density value conversion curve $F'_{FRO}(X)$ as indicated by the thick line in FIG. 27 which decreases at the slope of the compression factor (R) from the density reference value (BASE) toward the lower density on the pixel density conversion curve.

When the dynamic range compression processing operation as described hereinafter is carried out using the pixel density value conversion curve $F'_{FRO}(X)$ generated as described above, it becomes possible to express pixels showing the minimum density value $S_{min}$ in the subject area on the radiographic image, which were unable to be expressed in the case of the dynamic range compression processing being carried out using the normal pixel density value conversion curve, on a radiographic image after the dynamic range compression processing operation using the pixel density value conversion curve $F'_{FRO}(X)$.

On the other hand, the image smoothing portion 370 moves the mask of the size having M pixels×M pixels (M is an arbitrary constant) on the radiographic, digital image $S_{org}(x,y)$ indicated by the radiographic, digital image data supplied from the image data storage. portion 311 and calculates an average of pixel values existing in the mask at each moving portion. Then the smoothing portion 370 replaces the pixel values used for the calculation of the average with the average obtained, thereby smoothing the radiographic, digital image, and generates data to indicate a radiographic, digital image $S_{US}(x,y)$ thus smoothed. Then the smoothing portion 370 outputs the data to indicate the smoothed radiographic, digital image $S_{US}(x,y)$ thus generated, to the subsequent high-frequency image generating portion 371.

Then the high-frequency image generating portion 371 generates data indicating an image $S_{hp}(x,y)$ of high-frequency components in the radiographic, digital image $S_{org}(x,y)$ indicated by the radiographic, digital image data supplied from the image data storage portion 311, according to Eq. (6) below, using the data indicating the radiographic, digital image $S_{org}(x,y)$, supplied from the image data storage portion 311, and the data indicating the smoothed, radiographic, digital image $S_{US}(x,y)$, supplied from the image smoothing portion 370.

$$S_{hp}(x,y) = S_{org}(x,y) - S_{US}(x,Y) \tag{6}$$

Then the dynamic range compression processing portion 377 converts the adjusted pixel density value conversion curve $F_{FRO}(X)$ indicated by the thin line in FIG. 27, indicated by the data supplied from the pixel density value conversion curve defining portion 372, to the image density value conversion curve $F'_{FRO}(X)$ as indicated by the thick line in FIG. 27 in which the slope is decreased at the conversion factor (R) from the density reference value (BASE) to the lower density on the pixel density conversion curve, using the data indicating the density reference value (BASE), supplied from the density reference value defining portion 375, and the data indicating the compression factor (R), supplied from the compression factor defining portion 376. Further, the dynamic range compression processing portion 377 performs the dynamic range compression processing operation according to Eq. (7) below, using the data indicating the radiographic, digital image $S_{org}(x,y)$, supplied from the image data storage portion 311, and the data indicating the image of high-frequency components $S_{hp}(x,y)$, supplied from the high-frequency image generating portion 371.

$$S_{Drc}(x,y) = F'_{FRO}(S_{org}(x,y)) + [1 - \{\partial F'_{FRO}(S_{org}(x,y))\} / \{\partial S_{org}(x,y)\}] \times S_{hp}(x,y) \tag{7}$$

Namely, in accordance with above Eq. (7), the dynamic range compression processing portion 377 converts the pixel density values $S_{org}(x,y)$ of the radiographic, digital image supplied from the image data storage portion 311 to the pixel density values $F'_{FRO}(S_{org}(x,y))$ according to the pixel density value conversion curve $F'_{FRO}(X)$, and further adds thereto the image pixel density values $S_{hp}(x,y)$ of the image of high-frequency components supplied from the high-frequency image generating portion 371 according to the slope of the pixel density value conversion curve $F'_{FRO}(X)$, thereby accomplishing the dynamic range compression processing operation. By carrying out this dynamic range compression processing, it becomes possible to arbitrarily set the dynamic range compression characteristics to compress the dynamic range of the radiographic, digital image while maintaining the information of high-frequency components in the radiographic, digital image, according to the photographing portion.

Figure 28:
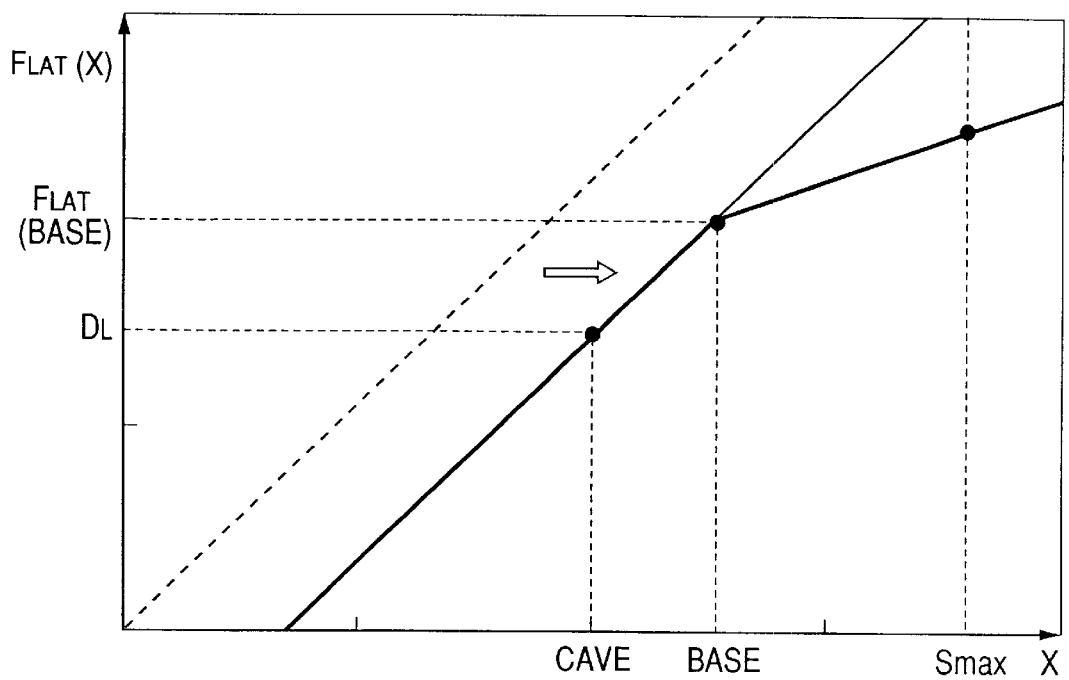
FIG. 28 is an explanatory diagram to explain the pixel density conversion characteristics on the occasion of photography of the side of the chest part.

In the image processing portion 317, when the side of the chest is discriminated as a photographing portion in the discriminating portion 313, the pixel density value conversion curve defining portion 372 first selects the function data indicating the pixel density value conversion characteristics (curve) as indicated by the dashed line in FIG. 28, according to the information representing the type of the radiographic device (i.e., the information indicating the radiographic, digital image taking device), outputted from the setting portion 312, the information concerning the photographing portion (i.e., the information indicating the side of the chest), outputted from the discriminating portion 313, and the information representing the type of the output device (i.e., the information indicating the film imager device), outputted from the output device selecting portion 314, from the memory table preliminarily storing the function data to indicate the pixel density value conversion characteristics respectively corresponding to the types of radiographic devices, photographing portions, and types of output devices.

On the other hand, the pixel density value conversion curve defining portion 372 receives the data indicating the averages Cave, Rave, Lave, supplied from the characteristic amount calculating portion 316. The defining portion 372 adjusts the pixel density value conversion curve by moving the curve in parallel in the direction indicated by the arrow in FIG. 28 up to the position indicated by the thin line in FIG. 28 so that the average Cave becomes the desired density value $D_L$ of the pulmonary field preliminarily set, on the pixel density value conversion curve as indicated by the dashed line in FIG. 28. Then the defining portion 372 outputs data indicating the pixel density value conversion curve $F_{LAT}((X)$ thus adjusted to the compression factor defining portion 376 and to the dynamic range compression processing means 377.

The subject area defining section 373 separates the subject area, which is a transmitted image of the subject excluding the through area where radiations impinge directly on the sensor or the like without passing the subject, from the radiographic image indicated by the radiographic, digital image data supplied from the image data storage portion 311, and then outputs information data representing the subject area thus separated to the subsequent subject area characteristic amount generating portion 374.

Then the subject area characteristic amount generating portion 374 generates the maximum pixel density value $S_{max}$ in the subject area, based on the information data representing the subject area supplied from the subject area defining portion 374, and outputs data indicating the maximum pixel density value $S_{max}$ thus generated as data indicating the characteristic amount of the subject area to the compression factor defining portion 376.

The density reference value defining portion 375 receives the data representing the average Cave supplied from the characteristic amount calculating portion 316 and calculates the density reference value (BASE) according to Eq. (8)

below. The density reference value defining portion 375 then outputs data indicating the density reference value (BASE) thus calculated to the compression factor defining portion 376 and to the dynamic range compression processing portion 377.

$$BASE = S_{max} + (S_{max} - Cave) \times \beta \quad (8)$$

In above Eq. (8) β is an arbitrary constant set according to the information concerning the type of the device outputting the radiographic, digital image data set in the setting portion.

Then the compression factor defining portion 376 receives the data indicating the adjusted pixel density value conversion curve $F_{LAT}(X)$ indicated by the thin line in FIG. 28, supplied from the pixel density value conversion curve defining portion 372, the data indicating the maximum pixel density value $S_{max}$ as the characteristic amount of the subject area from the subject area characteristic amount generating portion 374, and the data indicating the density reference value (BASE) from the density reference value defining portion 375, and the compression factor defining portion 376 calculates the compression factor (R) according to Eq. (9) below, based on the data supplied from the respective portions. Then the compression factor defining portion 376 outputs data indicating the compression factor (R) thus calculated to the dynamic range compression processing portion 377.

$$R = \{D_{max} - F_{LAT}(BASE)\} / (S_{max} - BASE) \quad (9)$$

In above Eq. (9), $D_{max}$ indicates the maximum density value after the dynamic range compression processing operation, which is a desired value arbitrarily determined, for example, in the range of "2.7" to "3.0".

As described above, the normal pixel density value conversion curve for photography of the side of the chest, which is preliminarily stored in the memory table in the pixel density value conversion curve defining portion 372, can be converted to the pixel density value conversion curve $F'_{LAT}(X)$ as indicated by the thick line in FIG. 28 in which the slope decreases at the compression factor (R) from the density reference value (BASE) toward the higher density on the pixel density conversion curve.

When the dynamic range compression processing operation described below is carried out using the pixel density value conversion curve $F'_{LAT}(X)$ generated as described above, it becomes possible to express pixels showing the maximum pixel density value $S_{max}$ in the subject area on the radiographic image, which were unable to be expressed when the dynamic range compression processing operation was carried out using the normal pixel density value conversion curve, on a radiographic image after the dynamic range compression processing operation using the pixel density value conversion curve $F'_{LAT}(X)$.

After that, the dynamic range compression processing portion 377 carries out the like processing as in the case where the photographing portion is the front of the chest as described above, whereby it can compress the dynamic range of the radiographic, digital image according to the dynamic range compression characteristics arbitrarily set according to the photographing portion of the radiographic, digital image while maintaining the information of high-frequency components in the radiographic, digital image data supplied from the image data storage portion 311.

As described above, the radiographic, digital image data resulting from the optimum dynamic range compression processing in the image processing portion 317 is supplied to the image output device 318, and the image output device 318 prints the radiographic, digital image on the film with laser intensities corresponding to the pixel values indicated by the radiographic, digital image data supplied from the image processing portion 317, whereby the radiographic, digital image can be formed in the compressed dynamic range according to the arbitrary dynamic range compression characteristics and in the optimum density on the film.

The operational example described above was explained as an example where the photographing portion was the "chest", but, for example in the case where the photographing portion is the "abdominal part", the system may be arranged so that the characteristic amount of image is computed from all the image areas corresponding to the positions of the photosensors indicated by 331, 332, 333 in FIG. 22 and the dynamic range compression processing is carried out based on the characteristic amount thus computed. In another case where the photographing portion is either of the "extremities", the system may be arranged so that the characteristic amount of image is computed from only the image area corresponding to the position of the photosensor indicated by 322 of FIG. 21 or by 333 of FIG. 22 and the dynamic range compression processing is carried out based on the characteristic amount thus computed. Further, in this case, the radiographic image taking device having the photosensors located at all the positions indicated by 331, 332, 333 of FIG. 22 does not have to be used, but the digital radiography can be performed by a radiographic image taking device having the photosensor located only at the position indicated by 333 of FIG. 22, as shown in FIG. 22.

As described above, the present embodiment can provide the radiographic, digital image processing system capable of automatically performing the optimum image processing for the radiographic, digital image without troubling the operator in such a manner that the same image processing effect can be achieved in the image area corresponding to the location of the photosensor on a variety of radiographic, digital images different in the photographing portion, in the physical constitution of the subject, and in the irradiation dose of radiations during radiography.

What is claimed is:

1. A radiographic, digital image processing system for processing a radiographic, digital image, comprising:
   (A) photosensor area defining means for defining an image area corresponding to a location of a photosensor for detecting intensity during radiography on a radiographic, digital image obtained by the radiography; and
   (B) characteristic amount generating means for generating a characteristic amount of the image area corresponding to the location of the photosensor on the radiographic, digital image defined by said photosensor area defining means.

2. A radiographic, digital image processing system according to claim 1, wherein said characteristic amount is either one selected from a maximum, a minimum, and an average of pixel values in the image area.

3. A radiographic, digital image processing system according to claim 1, said radiographic, digital image processing system further comprising input means for inputting radiographic, digital image data digitized from the image obtained by the radiography.

4. A radiographic, digital image processing system according to claim 3, said radiographic, digital image processing system further comprising storage means for storing the radiographic, digital image data inputted by said input means.

5. A radiographic, digital image processing system according to claim 3, said radiographic, digital image processing system further comprising image processing means for effecting image processing on the radiographic, digital image indicated by the radiographic, digital image data inputted by said input means, according to information concerning the characteristic amount generated in said characteristic amount generating means.

6. A radiographic, digital image processing system according to claim 5, said radiographic, digital image processing system further comprising image output means for outputting a visualized, radiographic, digital image corresponding to radiographic, digital image data resulting from the image processing in said image processing means.

7. A radiographic, digital image processing system according to claim 6, said radiographic, digital image processing system further comprising output device selecting means for selecting a type of an output device of said radiographic, digital image.

8. A radiographic, digital image processing system according to claim 7, wherein said image processing means comprises a look-up table storing data indicating density conversion curves in correspondence to types of output devices and said image processing means is arranged to read data indicating a corresponding density conversion curve from said look-up table, according to information concerning the type of the output device of the radiographic, digital image selected by said output device selecting means, and to effect density and/or gradation conversion processing on the radiographic, digital image data inputted by said input means, using the data indicating the density conversion curve thus read.

9. A radiographic, digital image processing system according to claim 7, wherein said image processing means is arranged to effect the image processing to control a dynamic range of the radiographic, digital image, according to information concerning the type of the output device of the radiographic, digital image selected by said output device selecting means and the information concerning the characteristic amount generated in said characteristic amount generating means, on the radiographic, digital image data inputted by said input means.

10. A radiographic, digital image processing system according to claim 7, wherein said image processing means comprises a look-up table storing data indicating pixel density value conversion curves for conversion of pixel density values of a radiographic, digital image in correspondence to types of generating sources and said image processing means is arranged to read data indicating a corresponding pixel density value conversion curve from said look-up table, according to information concerning the type of the output device of the radiographic, digital image selected by said output device selecting means, and to effect the image processing to control a dynamic range of the radiographic, digital image, on the radiographic, digital image data inputted by said input means, using the data indicating the pixel density value conversion curve thus read.

11. A radiographic, digital image processing system according to claim 7, wherein said image processing means comprises a look-up table storing data indicating standard pixel density value conversion curves for conversion of pixel density values of a radiographic, digital image in correspondence to types of generating sources and said image processing means is arranged to read data indicating a corresponding standard pixel density value conversion curve from said look-up table, according to information concerning the type of the output device of the radiographic, digital image selected by said output device selecting means, to adjust the standard pixel density value conversion curve indicated by the data thus read, according to the information concerning the photographing portion selected by said output device selecting means and the information concerning the characteristic amount generated in said characteristic amount generating means, and to effect the image processing to control a dynamic range of the radiographic, digital image, on the radiographic, digital image data inputted by said input means, using the pixel density value conversion curve thus adjusted.

12. A radiographic, digital image processing system according to claim 5, wherein said image processing means is arranged to set, according to the information concerning the characteristic amount generated in said characteristic amount generating means, a value at a predetermined position on a pixel density value conversion curve used in effecting the image processing to carry out density and/or gradation conversion processing of the radiographic, digital image indicated by the radiographic, digital image data, on the radiographic, digital image data inputted by said input means.

13. A radiographic, digital image processing system according to claim 5, wherein said image processing means is arranged to set, according to the information concerning the characteristic amount generated in said characteristic amount generating means, a value at a change point on a pixel density value conversion curve used in effecting the image processing to compress a dynamic range of the radiographic, digital image indicated by the radiographic, digital image data, on the radiographic, digital image data inputted by said input means.

14. A radiographic, digital image processing system according to claim 5, wherein said image processing means is arranged to set, according to the information concerning the characteristic amount generated in said characteristic amount generating means, a slope around a change point on a pixel density value conversion curve used in effecting the image processing to compress a dynamic range of the radiographic, digital image indicated by the radiographic, digital image data, on the radiographic, digital image data inputted by said input means.

15. A radiographic, digital image processing system according to claim 5, said radiographic, digital image processing system further comprising setting means for setting a type of a generating source of the radiographic, digital image data inputted by said input means.

16. A radiographic, digital image processing system according to claim 15, wherein said image processing means comprises a look-up table storing data indicating density conversion curves in correspondence to types of generating sources and said image processing means is arranged to read data indicating a corresponding density conversion curve from said look-up table according to the information concerning the type of the generating source set by said setting means and to effect density and/or gradation conversion processing on the radiographic, digital image data inputted by said input means, using the data indicating the density conversion curve thus read.

17. A radiographic, digital image processing system according to claim 15, wherein said image processing means comprises a look-up table storing data indicating density conversion curves in correspondence to kinds of photographing portions and said image processing means is arranged to read data indicating a corresponding density conversion curve from said look-up table according to the information concerning a kind of a photographing portion discriminated by discriminating means and to effect density and/or gradation conversion processing on the radiographic, digital image data inputted by said input means, using the data indicating the density conversion curve thus read.

18. A radiographic, digital image processing system according to claim 15, wherein said image processing means is arranged to effect the image processing to control a dynamic range of the radiographic, digital image according to information concerning the type of the generating source set by said setting means and the information concerning the characteristic amount generated in said characteristic amount generating means, on the radiographic, digital image data inputted by said input means.

19. A radiographic, digital image processing system according to claim 15, wherein said image processing means comprises a look-up table storing data indicating pixel density value conversion curves for conversion of pixel density values of a radiographic, digital image in correspondence to types of generating sources and said image processing means is arranged to read data indicating a corresponding pixel density value conversion curve from said look-up table, according to the information concerning the type of the generating source set by said setting means, and to effect the image processing to control a dynamic range of the radiographic, digital image, on the radiographic, digital image data inputted by said input means, using the data indicating the pixel density value conversion curve thus read.

20. A radiographic, digital image processing system according to claim 15, wherein said image processing means comprises a look-up table storing data indicating standard pixel density value conversion curves for conversion of pixel density values of a radiographic, digital image in correspondence to types of generating sources and said image processing means is arranged to read data indicating a corresponding standard pixel density value conversion curve from said look-up table, according to information concerning the type of the generating source set by said setting means, to adjust the standard pixel density value conversion curve indicated by the data thus read, according to the information concerning the type of the generating source set by said setting means and the information concerning the characteristic amount generated in said characteristic amount generating means, and to effect the image processing to control a dynamic range of the radiographic, digital image, on the radiographic, digital image data inputted by said input means, using the pixel density value conversion curve thus adjusted.

21. A radiographic, digital image processing system according to claim 5, said radiographic, digital image processing system further comprising discriminating means for discriminating a photographing portion of the radiographic, digital image indicated by the radiographic, digital image data inputted by said input means.

22. A radiographic, digital image processing system according to claim 21, wherein said image processing means is arranged to effect the image processing to carry out density and/or gradation conversion processing of the radiographic, digital image according to information concerning the photographing portion discriminated by said discriminating means and the information concerning the characteristic amount generated in said characteristic amount generating means, on the radiographic, digital image data inputted by said input means.

23. A radiographic, digital image processing system according to claim 21, wherein said image processing means is arranged to effect the image processing to control a dynamic range of the radiographic, digital image according to information 1concerning the photographing portion discriminated by said discriminating means and the information concerning the characteristic amount generated in said characteristic amount generating means, on the radiographic, digital image data inputted by said input means.

24. A radiographic, digital image processing system according to claim 21, wherein said image processing means comprises a look-up table storing data indicating density conversion curves in correspondence to kinds of photographing portions and said image processing means is arranged to read data indicating a corresponding density conversion curve from said look-up table according to the information concerning a kind of the photographing portion discriminated by said discriminating means and to effect density and/or gradation conversion processing on the radiographic, digital image data inputted by said input means, using the data indicating the density conversion curve thus read.

25. A radiographic, digital image processing system according to claim 21, wherein said image processing means comprises a look-up table storing data indicating pixel density value conversion curves for conversion of pixel density values of a radiographic, digital image in correspondence to types of generating sources and said image processing means is arranged to read data indicating a corresponding pixel density value conversion curve from said look-up table, according to information concerning the photographing portion discriminated by said discriminating means, and to effect the image processing to control a dynamic range of the radiographic, digital image, on the radiographic, digital image data inputted by said input means, using the data indicating the pixel density value conversion curve thus read.

26. A radiographic, digital image processing system according to claim 21, wherein said image processing means comprises a look-up table storing data indicating standard pixel density value conversion curves for conversion of pixel density values of a radiographic, digital image in correspondence to types of generating sources and said image processing means is arranged to read data indicating a corresponding standard pixel density value conversion curve from said look-up table, according to information concerning the photographing portion discriminated by said discriminating means, to adjust the standard pixel density value conversion curve indicated by the data thus read, according to the information concerning the photographing portion discriminated by said discriminating means and the information concerning the characteristic amount generated in said characteristic amount generating means, and to effect the image processing to control a dynamic range of the radiographic, digital image, on the radiographic, digital image data inputted by said input means, using the pixel density value conversion curve thus adjusted.

27. A radiographic, digital image processing system according to claim 3, said radiographic, digital image processing system further comprising setting means for setting a type of a generating source of the radiographic, digital image data inputted by said input means.

28. A radiographic, digital image processing system according to claim 27, wherein said setting means is arranged to automatically set the type of the generating source, according to the information concerning the type of the generating source accompanying the radiographic, digital image data inputted by said input means.

29. A radiographic, digital image processing system according to claim 27, wherein said photosensor area defining means is arranged to define the image area corresponding to the location of the photosensor for detecting intensity of radiations during the radiography on the radiographic, digital image indicated by the radiographic, digital image data inputted by said input means according to information concerning the type of the generating source set by said setting means.

30. A radiographic, digital image processing system according to claim 3, said radiographic, digital image processing system further comprising discriminating means for discriminating a photographing portion of the radiographic, digital image indicated by the radiographic, digital image data inputted by said input means.

31. A radiographic, digital image processing system according to claim 30, wherein said discriminating means is arranged to automatically discriminate the photographing portion, according to information concerning the photographing portion accompanying the radiographic, digital image data inputted by said input means.

32. A radiographic, digital image processing system according to claim 30, wherein said photosensor area defining means is arranged to define the image area corresponding to the location of the photosensor for detecting the intensity of radiations during the radiography on the radiographic, digital image indicated by the radiographic, digital image data inputted by said input means, according to information concerning the photographing portion of the radiographic, digital image discriminated by said discriminating means.

33. A radiographic, digital image processing system according to claim 3, said radiographic, digital image processing system further comprising output device selecting means for selecting a type of an output device of said radiographic, digital image.

34. A radiographic, digital image processing system according to claim 33, wherein said output device selecting means is arranged to automatically select the output device of the radiographic, digital image preliminarily set corresponding to a type of a generating source, according to a type of a generating source of the radiographic, digital image data inputted by said input means.

35. A radiographic, digital image processing system according to claim 33, wherein said output device selecting means is arranged to automatically select the output device of the radiographic, digital image preliminarily set corresponding to a type of a generating source, according to information concerning the type of the generating source accompanying the radiographic, digital image data inputted by said input means.

36. A radiographic, digital image processing system for processing a radiographic, digital image, comprising:

(A) input means for inputting radiographic, digital image data digitized from an image obtained by radiography;

(B) setting means for setting a type of a generating source of the radiographic, digital image data inputted by said input means;

(C) photosensor area defining means for defining an image area corresponding to a location of a photosensor for detecting intensity of radiations during the radiography on a radiographic, digital image indicated by the radiographic, digital image data inputted by said input means, according to information concerning the type of the generating source set by said setting means;

(D) characteristic amount calculating means for calculating a characteristic amount of the image area corresponding to the location of the photosensor on the radiographic, digital image, defined by said photosensor area defining means;

(E) discriminating means for discriminating a photographing portion of the radiographic, digital image indicated by the radiographic, digital image data inputted by said input means;

(F) output device selecting means for selecting a type of an output device of the radiographic, digital image;

(G) image processing means for effecting density and/or gradation conversion processing according to the information concerning the type of the generating source set by said setting means, information concerning the type of the output device of the radiographic, digital image selected by said output device selecting means, information concerning the photographing portion discriminated by said discriminating means, and information concerning the characteristic amount calculated by said characteristic amount calculating means; and (H) image output means for outputting a visualized, radiographic, digital image corresponding to radiographic, digital image data resulting from the image processing in said image processing means.

37. A radiographic, digital image processing system according to claim 36, wherein said setting means is arranged to automatically set the type of the generating source, according to the information concerning the type of the generating source accompanying the radiographic, digital image data inputted by said input means.

38. A radiographic, digital image processing system according to claim 36, wherein said discriminating means is arranged to automatically discriminate the photographing portion, according to the information concerning the photographing portion accompanying the radiographic, digital image data inputted by said input means.

39. A radiographic, digital image processing system according to claim 36, wherein said photosensor area defining means is arranged to automatically define the image area corresponding to the location of the photosensor on the radiographic, digital image, according to the information concerning the type of the generating source set by said setting means.

40. A radiographic, digital image processing system according to claim 36, wherein said image processing means comprises a look-up table storing data indicating density conversion curves in correspondence to types of generating sources and said image processing means is arranged to read data indicating a corresponding density conversion curve from said look-up table according to the information concerning the type of the generating source set by said setting means and to effect the density and/or gradation conversion processing on the radiographic, digital image data inputted by said input means, using the data indicating the density conversion curve thus read.

41. A radiographic, digital image processing system according to claim 36, wherein said image processing means comprises a look-up table storing data indicating density conversion curves in correspondence to kinds of photographing portions and said image processing means is arranged to read data indicating a corresponding density conversion curve from said look-up table according to information concerning a kind of the photographing portion discriminated by said discriminating means and to effect the density and/or gradation conversion processing on the radiographic, digital image data inputted by said input means, using the data indicating the density conversion curve thus read.

42. A radiographic, digital image processing system according to claim 36, wherein said image processing means comprises a look-up table storing data indicating density conversion curves in correspondence to types of output devices and said image processing means is arranged to read data indicating a corresponding density conversion curve from said look-up table, according to the information concerning the type of the output device of the radiographic, digital image selected by said output device selecting means, and to effect the density and/or gradation conversion processing on the radiographic, digital image data inputted by said input means, using the data indicating the density conversion curve thus read.

43. A radiographic, digital image processing system according to claim 36, said radiographic, digital image processing system further comprising storage means for storing the radiographic, digital image data inputted by said input means.

44. A radiographic, digital image processing system according to claim 36, wherein said characteristic amount is either one selected from a maximum, a minimum, an average, a median, and a mode.

45. A radiographic, digital image processing system according to claim 36, wherein said output device selecting means is arranged to automatically select the output device of the radiographic, digital image preliminarily set corresponding to the type of the generating source, according to the information concerning the type of the generating source set by said setting means.

46. A radiographic, digital image processing system according to claim 36, wherein said photosensor area defining means is arranged to automatically define the image area corresponding to the location of the photosensor on the radiographic, digital image, according to the information concerning the photographing portion discriminated by said discriminating means.

47. A radiographic, digital image processing system for processing a radiographic, digital image, comprising:

(A) input means for inputting radiographic, digital image data digitized from an image obtained by radiography;

(B) setting means for setting a type of a generating source of the radiographic, digital image data inputted by said input means;

(C) photosensor area defining means for defining an image area corresponding to a location of a photosensor for detecting intensity of radiations during the radiography on a radiographic, digital image indicated by the radiographic, digital image data inputted by said input means, according to information concerning the type of the generating source set by said setting means;

(D) subject area extracting means for, extracting an image area of a subject on the radiographic, digital image indicated by the radiographic, digital image data inputted by said input means and outputting information concerning the image area of the subject;

(E) photosensor area correcting means for correcting the image area corresponding to the location of the photosensor on the radiographic, digital image defined by said photosensor area defining means, according to the information concerning the image area of the subject outputted from said subject area extracting means;

(F) characteristic amount calculating means for calculating a characteristic amount of the image area corrected by said photosensor area correcting means;

(G) discriminating means for discriminating a photographing portion of the radiographic, digital image indicated by the radiographic, digital image data inputted by said input means;

(H) output device selecting means for selecting a type of an output device of the radiographic, digital image;

(I) image processing means for effecting density and/or gradation conversion processing according to the information concerning the type of the generating source set by said setting means, information concerning the type of the output device of the radiographic, digital image selected by said output device selecting means, information concerning the photographing portion discriminated by said discriminating means, and information concerning the characteristic amount calculated by said characteristic amount calculating means; and (J) image output means for outputting a visualized, radiographic, digital image corresponding to radiographic, digital image data resulting from the image processing in said image processing means.

48. A radiographic, digital image processing system according to claim 47, wherein said setting means is arranged to automatically set the type of the generating source, according to the information concerning the type of the generating source accompanying the radiographic, digital image data inputted by said input means.

49. A radiographic, digital image processing system according to claim 47, wherein said discriminating means is arranged to automatically discriminate the photographing portion, according to the information concerning the photographing portion accompanying the radiographic, digital image data inputted by said input means.

50. A radiographic, digital image processing system according to claim 47, wherein said photosensor area defining means is arranged to automatically define the image area corresponding to the location of the photosensor on the radiographic, digital image, according to the information concerning the type of the generating source set by said setting means.

51. A radiographic, digital image processing system according to claim 47, wherein said image processing means comprises a look-up table storing data indicating density conversion curves in correspondence to types of generating sources and said image processing means is arranged to read data indicating a corresponding density conversion curve from said look-up table according to the information concerning the type of the generating source set by said setting means and to effect the density and/or gradation conversion processing on the radiographic, digital image data inputted by said input means, using the data indicating the density conversion curve thus read.

52. A radiographic, digital image processing system according to claim 47, wherein said image processing means comprises a look-up table storing data indicating density conversion curves in correspondence to kinds of photographing portions and said image processing means is arranged to read data indicating a corresponding density conversion curve from said look-up table according to information concerning a kind of the photographing portion discriminated by said discriminating means and to effect the density and/or gradation conversion processing on the radiographic, digital image data inputted by said input means, using the data indicating the density conversion curve thus read.

53. A radiographic, digital image processing system according to claim 47, wherein said image processing means comprises a look-up table storing data indicating density conversion curves in correspondence to types of output devices and said image processing means is arranged to read data indicating a corresponding density conversion curve from said look-up table, according to the information concerning the type of the output device of the radiographic, digital image selected by said output device selecting means, and to effect the density and/or gradation conversion processing on the radiographic, digital image data inputted by said input means, using the data indicating the density conversion curve thus read.

54. A radiographic, digital image processing system according to claim 47, said radiographic, digital image processing system further comprising storage means for storing the radiographic, digital image data inputted by said input means.

55. A radiographic, digital image processing system according to claim 47, wherein said characteristic amount is either one selected from a maximum, a minimum, an average, a median, and a mode.

56. A radiographic, digital image processing system according to claim 47, wherein said output device selecting means is arranged to automatically select the output device of the radiographic, digital image preliminarily set corresponding to the type of the generating source, according to the information concerning the type of the generating source set by said setting means.

57. A radiographic, digital image processing system according to claim 47, wherein said photosensor area defining means is arranged to automatically define the image area corresponding to the location of the photosensor on the radiographic, digital image, according to the information concerning the photographing portion discriminated by said discriminating means.

58. A radiographic, digital image processing system according to claim 47, wherein said subject area extracting means is arranged to extract the image area of the subject on the radiographic, digital image, according to a histogram of pixel values of the radiographic, digital image indicated by the radiographic, digital image data inputted by said input means.

59. A radiographic, digital image processing system according to claim 47, wherein said subject area extracting means is arranged to extract the image area of the subject on the radiographic, digital image, according to a profile of pixel values of the radiographic, digital image indicated by the radiographic, digital image data inputted by said input means.

60. A radiographic, digital image processing system according to claim 47, wherein said photosensor area correcting means is arranged to output, as information concerning a corrected image area, information concerning an overlapping image area between the image area corresponding to the location of the photosensor on the radiographic, digital image defined by said photosensor area defining means and the image area of the subject indicated by the information data outputted from said subject area extracting means.

61. A radiographic, digital image processing system for processing a radiographic, digital image, comprising:
(A) input means for inputting radiographic, digital image data digitized from an image obtained by radiography;
(B) setting means for setting a type of a generating source of the radiographic, digital image data inputted by said input means;
(C) photosensor area defining means for defining an image area corresponding to a location of a photosensor for detecting intensity of radiations during the radiography on a radiographic, digital image indicated by the radiographic, digital image data inputted by said input means, according to information concerning the type of the generating source set by said setting means;
(D) characteristic amount calculating means for calculating a characteristic amount of the image area corresponding to the location of the photosensor on the radiographic, digital image, according to a histogram of pixel values in the image area corresponding to the location of the photosensor on the radiographic, digital image, defined by said photosensor area defining means;
(E) image processing means for effecting density and/or gradation conversion processing according to the information concerning the type of the generating source set by said setting means and information concerning the characteristic amount calculated by said characteristic amount calculating means; and
(F) image output means for outputting a visualized, radiographic, digital image corresponding to radiographic, digital image data resulting from the image processing in said image processing means.

62. A radiographic, digital image processing system according to claim 61, wherein said setting means is arranged to automatically set the type of the generating source, according to the information concerning the type of the generating source accompanying the radiographic, digital image data inputted by said input means.

63. A radiographic, digital image processing system according to claim 61, wherein said photosensor area defining means is arranged to automatically define the image area corresponding to the location of the photosensor on the radiographic, digital image, according to the information concerning the type of the generating source set by said setting means.

64. A radiographic, digital image processing system according to claim 61, wherein said image processing means comprises a look-up table storing data indicating density conversion curves in correspondence to types of generating sources and said image processing means is arranged to read data indicating a corresponding density conversion curve from said look-up table according to the information concerning the type of the generating source set by said setting means and to effect the density and/or gradation conversion processing on the radiographic, digital image data inputted by said input means, using the data indicating the density conversion curve thus read.

65. A radiographic, digital image processing system according to claim 61, wherein said characteristic amount calculating means is arranged to extract a predetermined image area on the radiographic, digital image, according to a histogram of pixel values in the image area corresponding to the location of the photosensor on the radiographic, digital image, defined by said photosensor area defining means, and to calculate the characteristic amount in the predetermined image area on the radiographic, digital image thus extracted.

66. A radiographic, digital image processing system according to claim 61, wherein said characteristic amount calculating means is arranged to extract an image area excluding an image area corresponding to an auxiliary device on the radiographic, digital image, according to a histogram of pixel values in the image area corresponding to the location of the photosensor on the radiographic, digital image, defined by said photosensor area defining means, and to calculate the characteristic amount in the predetermined image area on the radiographic, digital image thus extracted.

67. A radiographic, digital image processing system according to claim 61, wherein said characteristic amount is either one selected from a maximum, a minimum, an average, a median, and a mode.

68. A radiographic, digital image processing system according to claim 61, said radiographic, digital image processing system further comprising storage means for storing the radiographic, digital image data inputted by said input means.

69. A radiographic, digital image processing system according to claim 61, said radiographic, digital image processing system further comprising discriminating means for discriminating a photographing portion of the radiographic, digital image indicated by the radiographic, digital image data inputted by said input means.

70. A radiographic, digital image processing system according to claim 69, wherein said discriminating means is arranged to automatically discriminate the photographing portion, according to the information concerning the photographing portion accompanying the radiographic, digital image data inputted by said input means.

71. A radiographic, digital image processing system according to claim 69, wherein said photosensor area defining means is arranged to automatically define the image area corresponding to the location of the photosensor on the radiographic, digital image, according to the information concerning the photographing portion discriminated by said discriminating means.

72. A radiographic, digital image processing system according to claim 69, wherein said image processing means includes a look-up table storing data indicating density conversion curves in correspondence to kinds of photographing portions and said image processing means is arranged to read data indicating a corresponding density conversion curve from said look-up table according to information concerning a kind of the photographing portion discriminated by said discriminating means and to effect the density and/or gradation conversion processing on the radiographic, digital image data inputted by said input means, using the data indicating the density conversion curve thus read.

73. A radiographic, digital image processing system according to claim 61, said radiographic, digital image processing system further comprising output device selecting means for selecting a type of an output device of said radiographic, digital image.

74. A radiographic, digital image processing system according to claim 73, wherein said output device selecting means is arranged to automatically select the output device of the radiographic, digital image preliminarily set corresponding to the type of the generating source, according to the information concerning the type of the generating source set by said setting means.

75. A radiographic, digital image processing system according to claim 73, wherein said image processing means includes a look-up table storing data indicating density conversion curves in correspondence to types of output devices and said image processing means is arranged to read data indicating a corresponding density conversion curve from said look-up table according to information concerning the type of the output device of the radiographic, digital image selected by said output device selecting means and to effect the density and/or gradation conversion processing on the radiographic, digital image data inputted by said input means, using the data indicating the density conversion curve thus read.

76. A radiographic, digital image processing system for processing a radiographic, digital image, comprising:
(A) input means for inputting radiographic, digital image data digitized from an image obtained by radiography;
(B) photosensor area defining means for defining an image area corresponding to a location of a photosensor for detecting intensity of radiations during the radiography on a radiographic, digital image indicated by the radiographic, digital image data inputted by said input means;
(C) characteristic amount calculating means for calculating a characteristic amount of the image area corresponding to the location of the photosensor on the radiographic, digital image, defined by said photosensor area defining means;
(D) image processing means for effecting density and/or gradation conversion processing according to information concerning the characteristic amount calculated by said characteristic amount calculating means, on the radiographic, digital image data inputted by said input means; and
(E) image output means for outputting a visualized, radiographic, digital image corresponding to radiographic, digital image data resulting from the image processing in said image processing means.

77. A radiographic, digital image processing system according to claim 76, said radiographic, digital image processing system further comprising storage means for storing the radiographic, digital image data inputted by said input means.

78. A radiographic, digital image processing system according to claim 76, wherein said characteristic amount is either one selected from a maximum, a minimum, an average, a median, and a mode.

79. A radiographic, digital image processing system according to claim 76, said radiographic, digital image processing system further comprising setting means for setting a type of a generating source of the radiographic, digital image data inputted by said input means.

80. A radiographic, digital image processing system according to claim 79, wherein said setting means is arranged to automatically set the type of the generating source, according to the information concerning the type of the generating source accompanying the radiographic, digital image data inputted by said input means.

81. A radiographic, digital image processing system according to claim 79, wherein said photosensor area defining means is arranged to define the image area corresponding to the location of the photosensor for detecting the intensity of radiations during the radiography on the radiographic, digital image indicated by the radiographic, digital image data inputted by said input means, according to information concerning the type of the generating source set by said setting means.

82. A radiographic, digital image processing system according to claim 79, wherein said photosensor area defining means is arranged to automatically define the image area corresponding to the location of the photosensor on the radiographic, digital image, according to information concerning the type of the generating source set by said setting means.

83. A radiographic, digital image processing system according to claim 79, wherein said image processing means is arranged to effect the density and/or gradation conversion processing according to information concerning the type of the generating source set by said setting means and the information concerning the characteristic amount calculated by said characteristic amount calculating means, on the radiographic, digital image data inputted by said input means.

84. A radiographic, digital image processing system according to claim 79, wherein said image processing means includes a look-up table storing data indicating density conversion curves in correspondence to types of generating sources and said image processing means is arranged to read data indicating a corresponding density conversion curve from said look-up table according to information concerning the type of the generating source set by said setting means and to effect the density and/or gradation conversion processing on the radiographic, digital image data inputted by said input means, using the data indicating the density conversion curve thus read.

85. A radiographic, digital image processing system according to claim 76, said radiographic, digital image processing system further comprising discriminating means for discriminating a photographing portion of the radiographic, digital image indicated by the radiographic, digital image data inputted by said input means.

86. A radiographic, digital image processing system according to claim 85, wherein said discriminating means is arranged to automatically discriminate the photographing portion, according to the information concerning the photographing portion accompanying the radiographic, digital image data inputted by said input means.

87. A radiographic, digital image processing system according to claim 85, wherein said photosensor area defining means is arranged to define the image area corresponding to the location of the photosensor for detecting the intensity of radiations during the radiography on the radiographic, digital image indicated by the radiographic, digital image data inputted by said input means, according to information concerning the photographing portion discriminated by said discriminating means.

88. A radiographic, digital image processing system according to claim 85, wherein said photosensor area defining means is arranged to automatically define the image area corresponding to the location of the photosensor on the radiographic, digital image, according to information concerning the photographing portion discriminated by said discriminating means.

89. A radiographic, digital image processing system according to claim 85, wherein said image processing means is arranged to effect the density and/or gradation conversion processing according to information concerning the photographing portion discriminated by said discriminating means and the information concerning the characteristic amount calculated by said characteristic amount calculating means, on the radiographic, digital image data inputted by said input means.

90. A radiographic, digital image processing system according to claim 85, wherein said image processing means includes a look-up table storing data indicating density conversion curves in correspondence to kinds of photographing portions and said image processing means is arranged to read data indicating a corresponding density conversion curve from said look-up table according to the information concerning a kind of the photographing portion discriminated by said discriminating means and to effect the density and/or gradation conversion processing on the radiographic, digital image data inputted by said input means, using the data indicating the density conversion curve thus read.

91. A radiographic, digital image processing system according to claim 76, said radiographic, digital image processing system further comprising output device selecting means for selecting a type of an output device of said radiographic, digital image.

92. A radiographic, digital image processing system according to claim 91, wherein said output device selecting means is arranged to automatically select the output device of the radiographic, digital image preliminarily set corresponding to the type of the generating source, according to the type of the generating source of the radiographic, digital image data inputted by said input means.

93. A radiographic, digital image processing system according to claim 91, wherein said output device selecting means is arranged to automatically select the output device of the radiographic, digital image preliminarily set corresponding to the type of the generating source, according to information concerning the type of the generating source accompanying the radiographic, digital image data inputted by said input means.

94. A radiographic, digital image processing system according to claim 91, wherein said image processing means is arranged to effect the density and/or gradation conversion processing according to information concerning the type of the output device of the radiographic, digital image selected by said output device selecting means and the information concerning the characteristic amount calculated by said characteristic amount calculating means, on the radiographic, digital image data inputted by said input means.

95. A radiographic, digital image processing system according to claim 91, wherein said image processing means includes a look-up table storing data indicating density conversion curves in correspondence to types of output devices and said image processing means is arranged to read data indicating a corresponding density conversion curve from said look-up table according to information concerning the type of the output device of the radiographic, digital image selected by said output device selecting means and to effect the density and/or gradation conversion processing on the radiographic, digital image data inputted by said input means, using the data indicating the density conversion curve thus read.

96. A radiographic, digital image processing system for processing a radiographic, digital image, comprising:

(A) detecting means disposed at a predetermined location for detecting intensity of radiations at a subject during radiography;

(B) input means for inputting image data obtained by said radiography;

(C) area defining means for defining an image area corresponding to the location of said detecting means on an image of the image data inputted by said input means;

(D) weighting means for calculating a value of each pixel value of the image area defined by said area defining means, multiplied by a predetermined weighting factor; and (E) image processing means for effecting density and/or gradation conversion processing according to the weighted value by said weighting means, on the image data inputted by said input means.

97. A radiographic, digital image processing system according to claim 96, said radiographic, digital image processing system further comprising image output means for outputting image data resulting from the image processing by said image processing means.

98. A radiographic, digital image processing system according to claim 96, wherein said weighting means is arranged to vary said weighting factors from a center line to a peripheral part of a detection area of said detecting means.

99. A radiographic, digital image processing system according to claim 96, wherein said weighting means is arranged to vary said weighting factors from a center point to a peripheral part of a detection area of said detecting means.

100. A radiographic, digital image processing system according to claim 96, said radiographic, digital image processing system further comprising storage means for storing the image data inputted by said input means.

101. A radiographic, digital image processing system according to claim 96, said radiographic, digital image processing system further comprising setting means for setting a type of a generating source of the image data inputted by said input means.

102. A radiographic, digital image processing system according to claim 101, wherein said setting means is arranged to automatically set the type of the generating source, based on information concerning the type of the generating source accompanying the image data inputted by said input means.

103. A radiographic, digital image processing system according to claim 101, wherein said area defining means is arranged to define the image area corresponding to the location of said detecting means indicated by the image data inputted by said input means, based on information concerning the type of the generating source set by said setting means.

104. A radiographic, digital image processing system according to claim 101, wherein said area defining means is arranged to automatically define the image area corresponding to the location of said detecting means, based on information concerning the type of the generating source set by said setting means.

105. A radiographic, digital image processing system according to claim 101, wherein said image processing means is arranged to effect the density and/or gradation conversion processing according to information concerning the type of the generating source set by said setting means and said weighted value, on the image data inputted by said input means.

106. A radiographic, digital image processing system according to claim 101, wherein said image processing means comprises a look-up table storing data indicating density conversion curves in correspondence to types of generating sources and said image processing means is arranged to read data indicating a corresponding density conversion curve from said look-up table, based on information concerning the type of the generating source set by said setting means, and to effect the density and/or gradation conversion processing on the image data inputted by said input means, using the data indicating the density conversion curve thus read.

107. A radiographic, digital image processing system according to claim 96, said radiographic, digital image processing system further comprising discriminating means for discriminating a photographing portion of the image indicated by the image data inputted by said input means.

108. A radiographic, digital image processing system according to claim 107, wherein said discriminating means is arranged to automatically discriminate the photographing portion, based on information concerning the photographing portion accompanying the radiographic, digital image data inputted by said input means.

109. A radiographic, digital image processing system according to claim 107, wherein said area defining means is arranged to define the image area corresponding to the location of said detecting means indicated by the image data inputted by said input means, based on information concerning the photographing portion of the image discriminated by said discriminating means.

110. A radiographic, digital image processing system according to claim 107, wherein said area defining means is arranged to automatically define the image area corresponding to the location of said detecting means indicated by the image data inputted by said input means, based on information concerning the photographing portion accompanying the image data inputted by said input means.

111. A radiographic, digital image processing system according to claim 107, wherein said image processing means is arranged to effect the density and/or gradation conversion processing according to information concerning the photographing portion discriminated by said discriminating means and said weighted value, on the image data inputted by said input means.

112. A radiographic, digital image processing system according to claim 107, wherein said image processing means comprises a look-up table storing data indicating density conversion curves in correspondence to kinds of photographing portions and said image processing means is arranged to read data indicating a corresponding density conversion curve from said look-up table, based on information concerning the photographing portion discriminated by said discriminating means, and to effect the density and/or gradation conversion processing on the image data inputted by said input means, using the data indicating the density conversion curve thus read.

113. A radiographic, digital image processing system according to claim 107, said radiographic, digital image processing system further comprising selecting means for selecting a type of an image output device for visualizing the image data outputted from said image output means to output a visualized image.

114. A radiographic, digital image processing system according to claim 113, wherein said selecting means is arranged to automatically select the image output device preliminarily set corresponding to the type of the generating source, based on the type of the generating source of the image data inputted by said input means.

115. A radiographic, digital image processing system according to claim 113, wherein said selecting means is arranged to automatically select the image output device preliminarily set corresponding to the type of the generating source, based on information concerning the type of the generating source accompanying the image data inputted by said input means.

116. A radiographic, digital image processing system according to claim 113, wherein said image processing means is arranged to effect the density and/or gradation conversion processing according to information concerning the type of the image output device selected by said selecting means and the value calculated by said weighting means, on the image data inputted by said input means.

117. A radiographic, digital image processing system according to claim 113, wherein said image processing means comprises a look-up table storing data indicating density conversion curves in correspondence to types of output devices and said image processing means is arranged to read data indicating a corresponding density conversion curve from said look-up table, according to information concerning the type of the image output device selected by said selecting means, and to effect the density and/or gradation conversion processing on the image data inputted by said input means, using the data indicating the density conversion curve thus read.

118. A radiographic, digital image processing method for processing a radiographic, digital image, comprising the following steps:
  (A) a step of detecting intensity of radiations at a subject during radiography, using detecting means disposed at a predetermined location;
  (B) a step of inputting image data obtained by said radiography;

(C) a step of defining an image area corresponding to the location of said detecting means on an image of the image data inputted in said inputting step;

(D) a step of calculating a value of a pixel value of the image area defined in said area defining step, multiplied by a predetermined weighting factor; and (E) a step of effecting density and/or gradation conversion processing according to the weighted value in said weighting step, on the image data inputted in said inputting step.

119. A storage medium capable of being read by a computer storing a program for carrying out radiographic, digital image processing for processing a radiographic, digital image, said storage medium comprising a program for carrying out the following processes:

(A) a process of detecting intensity of radiations at a subject during radiography using detecting means disposed at a predetermined location;

(B) a process of inputting image data obtained by said radiography;

(C) a process of defining an image area corresponding to the location of said detecting means on an image of the image data inputted in said inputting process;

(D) a process of calculating a value of a pixel value of the image area defined in said area defining process, multiplied by a predetermined weighting factor; and (E) a process of effecting density and/or gradation conversion processing according to the weighted value in said weighting process, on the image data inputted in said inputting process.

120. A radiographic, digital image processing system for processing a radiographic, digital image, comprising:

(A) input means for inputting radiographic, digital image data digitized from an image obtained by radiography;

(B) photosensor area defining means for defining an image area corresponding to a location of a photosensor for detecting intensity during the radiography on a radiographic, digital image indicated by the radiographic, digital image data inputted by said input means;

(C) characteristic amount generating means for generating a characteristic amount of the image area corresponding to the location of the photosensor on the radiographic, digital image, defined by said photosensor area defining means;

(D) image processing means for effecting image processing to control a dynamic range of the radiographic, digital image indicated by the radiographic, digital image data, on the radiographic, digital image data inputted by said input means, according to information concerning the characteristic amount generated by said characteristic amount generating means; and (E) image output means for outputting a visualized, radiographic, digital image corresponding to radiographic, digital image data resulting from the image processing in said image processing means.

121. A radiographic, digital image processing system according to claim 120, said radiographic, digital image processing system further comprising storage means for storing the radiographic, digital image data inputted by said input means.

122. A radiographic, digital image processing system according to claim 120, wherein said characteristic amount is either one selected from a maximum, a minimum, and an average of pixel values in the image area.

123. A radiographic, digital image processing system according to claim 120, wherein said image processing means is arranged to set, according to the information concerning the characteristic amount generated in said characteristic amount generating means, a value at a change point on a pixel density value conversion curve used in effecting the image processing to compress the dynamic range of the radiographic, digital image indicated by the radiographic, digital image data, on the radiographic, digital image data inputted by said input means.

124. A radiographic, digital image processing system according to claim 120, wherein said image processing means is arranged to set, according to the information concerning the characteristic amount generated in said characteristic amount generating means, a slope around a change point on a pixel density value conversion curve used in effecting the image processing to compress the dynamic range of the radiographic, digital image indicated by the radiographic, digital image data, on the radiographic, digital image data inputted by said input means.

125. A radiographic, digital image processing system according to claim 120, said radiographic, digital image processing system further comprising setting means for setting a type of a generating source of the radiographic, digital image data inputted by said input means.

126. A radiographic, digital image processing system according to claim 125, wherein said setting means is arranged to automatically set the type of the generating source, according to information concerning the type of the generating source accompanying the radiographic, digital image data inputted by said input means.

127. A radiographic, digital image processing system according to claim 125, wherein said photosensor area defining means is arranged to define the image area corresponding to the location of the photosensor for detecting the intensity of radiations during the radiography on the radiographic, digital image indicated by the radiographic, digital image data inputted by said input means, according to information concerning the type of the generating source set by said setting means.

128. A radiographic, digital image processing system according to claim 125, wherein said image processing means is arranged to effect the image processing to control the dynamic range of the radiographic, digital image according to information concerning the type of the generating source set by said setting means and the information concerning the characteristic amount generated in said characteristic amount generating means, on the radiographic, digital image data inputted by said input means.

129. A radiographic, digital image processing system according to claim 125, wherein said image processing means comprises a look-up table storing data indicating pixel density value conversion curves for conversion of pixel density values of a radiographic, digital image in correspondence to types of generating sources and said image processing means is arranged to read data indicating a corresponding pixel density value conversion curve from said look-up table, according to information concerning the type of the generating source set by said setting means, and to effect the image processing to control the dynamic range of the radiographic, digital image, on the radiographic, digital image data inputted by said input means, using the data indicating the pixel density value conversion curve thus read.

130. A radiographic, digital image processing system according to claim 125, wherein said image processing means comprises a look-up table storing data indicating standard pixel density value conversion curves for conversion of pixel density values of a radiographic, digital image in correspondence to types of generating sources and said image processing means is arranged to read data indicating a corresponding standard pixel density value conversion curve from said look-up table, according to information concerning the type of the generating source set by said setting means, to adjust the standard pixel density value conversion curve indicated by the data thus read, according to the information concerning the type of the generating source set by said setting means and the information concerning the characteristic amount generated in said characteristic amount generating means, and to effect the image processing to control the dynamic range of the radiographic, digital image, on the radiographic, digital image data inputted by said input means, using the pixel density value conversion curve thus adjusted.

131. A radiographic, digital image processing system according to claim 120, said radiographic, digital image processing system further comprising discriminating means for discriminating a photographing portion of the radiographic, digital image indicated by the radiographic, digital image data inputted by said input means.

132. A radiographic, digital image processing system according to claim 131, wherein said discriminating means is arranged to automatically discriminate the photographing portion, according to information concerning the photographing portion accompanying the radiographic, digital image data inputted by said input means.

133. A radiographic, digital image processing system according to claim 131, wherein said photosensor area defining means is arranged to define the image area corresponding to the location of the photosensor for detecting the intensity of radiations during the radiography on the radiographic, digital image indicated by the radiographic, digital image data inputted by said input means, according to information concerning the photographing portion of the radiographic, digital image discriminated by said discriminating means.

134. A radiographic, digital image processing system according to claim 131, wherein said image processing means is arranged to effect the image processing to control the dynamic range of the radiographic, digital image according to information concerning the photographing portion discriminated by said discriminating means and the information concerning the characteristic amount generated in said characteristic amount generating means, on the radiographic, digital image data inputted by said input means.

135. A radiographic, digital image processing system according to claim 131, wherein said image processing means comprises a look-up table storing data indicating pixel density value conversion curves for conversion of pixel density values of a radiographic, digital image in correspondence to types of generating sources and said image processing means is arranged to read data indicating a corresponding pixel density value conversion curve from said look-up table, according to information concerning the photographing portion discriminated by said discriminating means, and to effect the image processing to control the dynamic range of the radiographic, digital image, on the radiographic, digital image data inputted by said input means, using the data indicating the pixel density value conversion curve thus read.

136. A radiographic, digital image processing system according to claim 131, wherein said image processing means comprises a look-up table storing data indicating standard pixel density value conversion curves for conversion of pixel density values of a radiographic, digital image in correspondence to types of generating sources and said image processing means is arranged to read data indicating a corresponding standard pixel density value conversion curve from said look-up table, according to information concerning the photographing portion discriminated by said discriminating means, to adjust the standard pixel density value conversion curve indicated by the data thus read, according to the information concerning the photographing portion discriminated by said discriminating means and the information concerning the characteristic amount generated in said characteristic amount generating means, and to effect the image processing to control the dynamic range of the radiographic, digital image, on the radiographic, digital image data inputted by said input means, using the pixel density value conversion curve thus adjusted.

137. A radiographic, digital image processing system according to claim 120, said radiographic, digital image processing system further comprising output device selecting means for selecting a type of an output device of said radiographic, digital image.

138. A radiographic, digital image processing system according to claim 137, wherein said output device selecting means is arranged to automatically select the output device of the radiographic, digital image preliminarily set corresponding to the type of the generating source, according to the type of the generating source of the radiographic, digital image data inputted by said input means.

139. A radiographic, digital image processing system according to claim 137, wherein said output device selecting means is arranged to automatically select the output device of the radiographic, digital image preliminarily set corresponding to the type of the generating source, according to information concerning the type of the generating source accompanying the radiographic, digital image data inputted by said input means.

140. A radiographic, digital image processing system according to claim 137, wherein said image processing means is arranged to effect the image processing to control the dynamic range of the radiographic, digital image according to information concerning the type of the output device of the radiographic, digital image selected by said output device selecting means and the information concerning the characteristic amount generated in said characteristic amount generating means, on the radiographic, digital image data inputted by said input means.

141. A radiographic, digital image processing system according to claim 137, wherein said image processing means comprises a look-up table storing data indicating pixel density value conversion curves for conversion of pixel density values of a radiographic, digital image in correspondence to types of generating sources and said image processing means is arranged to read data indicating a corresponding pixel density value conversion curve from said look-up table, according to information concerning the type of the output device of the radiographic, digital image selected by said output device selecting means, and to effect the image processing to control the dynamic range of the radiographic, digital image, on the radiographic, digital image data inputted by said input means, using the data indicating the pixel density value conversion curve thus read.

142. A radiographic, digital image processing system according to claim 137, wherein said image processing means comprises a look-up table storing data indicating standard pixel density value conversion curves for conversion of pixel density values of a radiographic, digital image in correspondence to types of generating sources and said image processing means is arranged to read data indicating a corresponding standard pixel density value conversion curve from said look-up table, according to information concerning the type of the output device of the radiographic, digital image selected by said output device selecting means, to adjust the standard pixel density value conversion curve indicated by the data thus read, according to the information concerning the type of the output device of the radiographic, digital image selected by said output device selecting means and the information concerning the characteristic amount generated in said characteristic amount generating means, and to effect the image processing to control the dynamic range of the radiographic, digital image, on the radiographic, digital image data inputted by said input means, using the pixel density value conversion curve thus adjusted.

* * * * *

UNITED STATES PATENT AND TRADEMARK OFFICE
CERTIFICATE OF CORRECTION

PATENT NO.   : 6,314,198 B1
DATED        : November 6, 2001
INVENTOR(S)  : Takashi Ogura It is certified that error appears in the above-identified patent and that said Letters Patent is hereby corrected as shown below:

Title page,
Item [30], Foreign Application Priority Data, "Sep. 25, 1996 (JP)… 10-271576" should read -- Sep. 25, 1998 (JP)… 10-271576 --

Column 2,
Line 19, "described itu above" should read -- described above --

Column 6,
Line 35, "Illustrated" should read -- illustrated --

Column 36,
Line 30, "Eq. (4) a" should read -- Eq. (4) $\alpha$ --

Column 37,
Line 13, "storage. portion" should read -- storage portion --
Line 35, equation (6), "$S_{hp}(x,y)=S_{org}(x,y)-S_{US}(x,Y)$" should read
-- $S_{hp}(x,y)=S_{org}(x,y)-S_{US}(x,y)$ --

Column 44,
Line 3, "information 1concerning" should read -- information concerning --

Column 47,
Line 47, "for, extracting" should read -- for extracting --

Signed and Sealed this

Twenty-seventh Day of August, 2002

JAMES E. ROGAN
*Director of the United States Patent and Trademark Office*

*Attest:*

*Attesting Officer*